United States Patent [19]

Marisetty

[11] Patent Number: 5,271,020
[45] Date of Patent: Dec. 14, 1993

[54] BUS STRETCHING PROTOCOL FOR HANDLING INVALID DATA

[75] Inventor: Suresh K. Marisetty, San Jose, Calif.

[73] Assignee: Intel Corporation, Santa Clara, Calif.

[21] Appl. No.: 632,061

[22] Filed: Dec. 21, 1990

[51] Int. Cl.$^5$ .................. H04L 1/00; G06F 11/00
[52] U.S. Cl. ............................ 371/30; 371/35; 371/37.1
[58] Field of Search ............... 371/35, 30-34, 371/37.1

[56] References Cited

U.S. PATENT DOCUMENTS

| | | | |
|---|---|---|---|
| 4,454,601 | 6/1984 | Helms et al. | 371/34 |
| 5,070,503 | 12/1991 | Shikakura | 371/37.1 |
| 5,107,503 | 4/1992 | Riggle et al. | 371/37.1 |
| 5,127,013 | 6/1992 | Yoshida | 371/32 |
| 5,130,993 | 7/1992 | Gutman et al. | 371/42 |
| 5,163,056 | 11/1992 | Hagiwara et al. | 371/37.1 |

Primary Examiner—Hoa T. Nguyen
Attorney, Agent, or Firm—Blakely, Sokoloff, Taylor & Zafman

[57] ABSTRACT

A method of handling invalid data being transmitted from a first agent to a second agent. If the first agent determines that the data it is to transmit is invalid data, then the first agent transmits an error signal to the second agent indicating invalid data. The first agent then attempts to correct the invalid data, and transmits the attempted corrected invalid data to the second agent after a predetermined period of time. Thereafter, the first agent transmits any remaining data not yet transmitted. If the second agent receives the error signal, then it suspends reading data for the predetermined period, and thereafter resumes reading data.

10 Claims, 23 Drawing Sheets

BUS STRETCHING PROTOCOL FOR HANDLING INVALID DATA

FIELD OF THE INVENTION

The present invention relates to the field of error correction and detection of data transmissions. More particularly, this invention relates to delaying data transmission during a detect and correct sequence to create a stretching of the bus protocol to avoid retransmission of previously transmitted valid data.

BACKGROUND OF THE INVENTION

Whenever data is transmitted from one agent (e.g., processor, memory, input/output device, etc.) to another agent there is the possibility that the data will be exposed to transmission errors. These transmission errors can be caused by spurious signals, such as power fluctuations, electromagnetic fields, etc., affecting the medium used to transmit the data. Additionally, because data can become corrupted in a variety of ways, whenever one agent transmits data to another agent there is the possibility that the data is at least partially corrupted before it is even transmitted.

Prior art approaches to handling error detection and correction have been as rudimentary as simple parity checking and have been as involved as specialized error detection and correction circuitry. Simple parity checking usually involves either the sending agent or the receiving agent comparing a single bit with the sum of all the other bits. For instance, if the sum is an odd number and the single bit is a 1, or if the sum is an even number and the single bit is a 0, then parity checks and hence no error is reported. However, if the sum is an even number and the single bit is a 1, or if the sum is an odd number and the single bit is a 0, then parity does not check and an error is reported.

Parity checking, while relatively easy to implement, has at least three disadvantages. First, every portion of data transmitted must be checked to be sure the parity is correct. Second, if a parity error is detected, the only option is to have the data retransmitted in the hopes that the error occured in the transmission itself. However, if the error was due to the sending agent having corrupted data, mere retransmission will not avoid another parity error. In the case of the sending agent having corrupted data, parity errors will continue to be found, until either the sending agent stops trying to send the data or the receiving agent stops requesting the data. The third disadvantage of parity checking also occurs if a parity error is detected. Then, even though the sending agent and the receiving agent may both know that there was an error in the data already sent, the error may not have been brought to the receiving agent's attention in time to prevent the receiving agent from processing the good data sent before bad data. In that case, when the data is resent, it will be processed again. This repetitive process of sending data, processing it, and learning that is bad data will continue, as state above, until either the sending agent stops trying to send the data or the receiving agent stops requesting the data.

Specialized error correction and detection circuitry (ECC) is often used to avoid either sending bad data or relying on bad data. Error correction and detection circuitry can be utilized in several ways. One way to use ECC is known as the correct always mode. Referring to FIG. 18, a simplified correct always circuit is shown whereby data from the sending agent is transmitted on signal line 1801 to correction circuitry 1803 (usually contained with the controller interface of the sending agent). Correction circuitry 1803 performs correction steps on the data and transmits the corrected data on signal line 1805 to bus 1807 which carries the data to the receiving agent. Using a correct always ECC approach assumes that the data is bad even when it isn't which is evident by the fact that the data is always being corrected even when it may be perfectly valid. Thus, the correct always ECC approach introduces latency into every data transmission by requiring the data to be corrected even when it may be valid. This correction latency may not be acceptable in today's high speed data transmissions of large amounts of data.

Another way to use ECC circuitry is known as the detect and correct mode. Referring to FIG. 20, the detect and correct ECC approach can be seen whereby the sending agent transmits data on signal line 2001 to the ECC circuitry (again, usually found in the controller interface of the sending agent). The ECC circuitry passes the incoming data on signal line 2001 to three signal lines 2002, 2003, and 2004. The detect and correct ECC approach takes the opposite assumption to that of the correct always ECC approach. The detect and correct ECC approach assumes that the data is always valid and transmits the data (input on signal line 2001 to signal line 2003) to output multiplexor (MUX) 2011. Output MUX 2011 transmits the data on signal line 2013 to bus 2015 which carries the data to the receiving agent.

While the data is being carried on signal line 2003 of FIG. 20, to the output MUX 2011, the data is also being carried on signal line 2002 to error detection logic 2005. Error detection logic 2005 is continuously checking the data for any data errors. If error detection logic 2005 detects an error in the data being transmitted, error detection logic 2005 sends out an error flag on signal line 2008.

Error correction logic 2007 continually tracks which was the last portion of data transmitted by the sending agent through the controller interface. In actual practice, the controller interface of the sending agent usually contains a buffer which holds the data being transmitted by the sending agent. The buffer may be used in a flyby mode, in which case the controller interface is merely placing the data in the buffer at the same time the controller interface is transmitting the data across the bus 2015 to the receiving agent. Alternatively, the buffer may be used as a short term holding place for the data, kept until the controller interface is ready to transmit the data from the buffer acriss the bus 2015 to the receiving agent.

Error correction logic 2007, upon receiving the error flag from signal line 2010 (which is itself connected to signal line 2008), attempts to correct the bad data. If the data is bad because of only a single bit error, the error correction logic 2007 may be able to correct the error on the fly and immediately send the corrected data to the receiving agent through output mux 2011. This is accomplished by having output mux 2011 switch its input (due to receiving the error flag on signal line 2009, which is connected to signal line 2008) from the straight through data transmission of signal line 2003 to the corrected data from signal line 2006. Note that correction of the bad data on the fly is more likely to be successful if the transmission to the receiving agent is handled with an asynchronous transmission as this may allow more time to correct the bad data before the receiving agent has actually received the bad data.

However, if the error in the data which error detection logic 2005 detected is more serious than a single bit error, or if the transmission is synchronous, then a simple correction and retransmission on the fly is not usually possible in the prior art. Instead, the error correction logic 2007, upon receiving the error flag on signal line 2010, attempts to correct the bad data and will update the sending agent with the corrected data in what is commonly known as a "scrubbing" operation. Then, the receiving agent, also having received the error flag, would request retransmission of the data.

Retransmission requires an additional bus transaction to request retransmission of the data. Retransmission also requires that the sending agent resend the entire portions of data originally requested, not just the corrected bad data and any data which would have followed the bad data had it not been bad. Further, during the delay between the time the receiving agent began originally receiving data and the time the receiving agent received the error flag, the receiving agent may have completed a considerable amount of processing on the data. With a retransmission of the entire portions of data originally requested, all of this processing would now have to be repeated. While this may be acceptable with single word transfers of data (because reprocessing of a single word may be an acceptable performance degradation as compared to a more elaborate error detection and correction methodology), modern burst transmissions of numerous words usually cannot afford to have the receiving agent re-process large amounts of data. Additionally, with modern burst transmissions of large amounts of data and multiple agents vying for bus access and system resources, the bus and system overhead of retransmission requests and retransmissions of large amounts of good data for the occasional portion of bad data is not acceptable.

SUMMARY AND OBJECTS OF THE INVENTION

One objective of the present invention is to provide an improved method of handling invalid data being transmitted from one agent to another agent.

Another objective of the present invention is to provide an improved method of handling invalid data being transmitted from one agent to another agent whereby if the first agent detects invalid data, then the first agent transmits a signal to the second agent indicating the invalid data, the first agent attempts to correct the invalid data, the first agent transmits the attempted corrected invalid data to the second agent after a predetermined period, and the first agent transmits any remaining data not yet transmitted. If the second agent, receiving data from the first agent, receives a signal indicating invalid data, then the second agent suspends reading data for the predetermined period, and the second agent resumes reading data.

More specifically, the predetermined period of the present invention is two clock cycles.

More specifically, the present invention transmits the data across a computer bus.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

In the early days of data processing, when computers were large enough to fill a room, the standard processing environment consisted of a single processor running a single job or task. This single task had complete control over all available memory and input/output (I/O) devices and there was no concern about contention for memory of I/O. Then, as processor speed increased, the standard environment changed.

Figure 1:
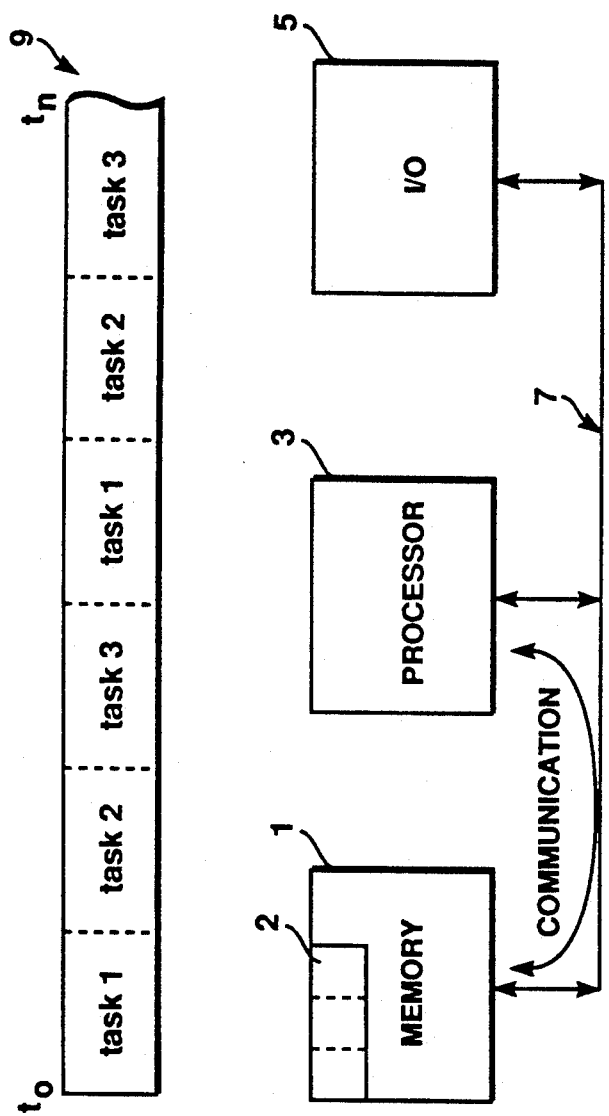
FIG. 1 depicts a prior art multi-tasking, time-sharing architecture.

Referring now to FIG. 1, a prior art multi-tasking time-sharing architecture can be seen. Using a higher performance processor 3, each task could then receive a mere slice or portion of the available time 9 on the processor 3 and, because the processor 3 could quickly switch from running one task to running another task, each task would think that it was getting all of the processor's time 9. Further, each task would think that it had access to all the available memory 1 and I/O 5. However, if one task wanted to communicate with another task, because they weren't actually running at the same time they couldn't directly communicate. Instead, an area 2 of the global shared memory 1 was usually reserved for task-to-task communication which thus occurred across bus 7.

As individual tasks continued to grow in size and complexity, even the fast time-sharing processor 3 was unable to juggle quickly enough to keep all the tasks running. This led to new types of processing architectures in which multiple processors 3 were used to handle the multitude of tasks waiting to be run.

Figure 2:
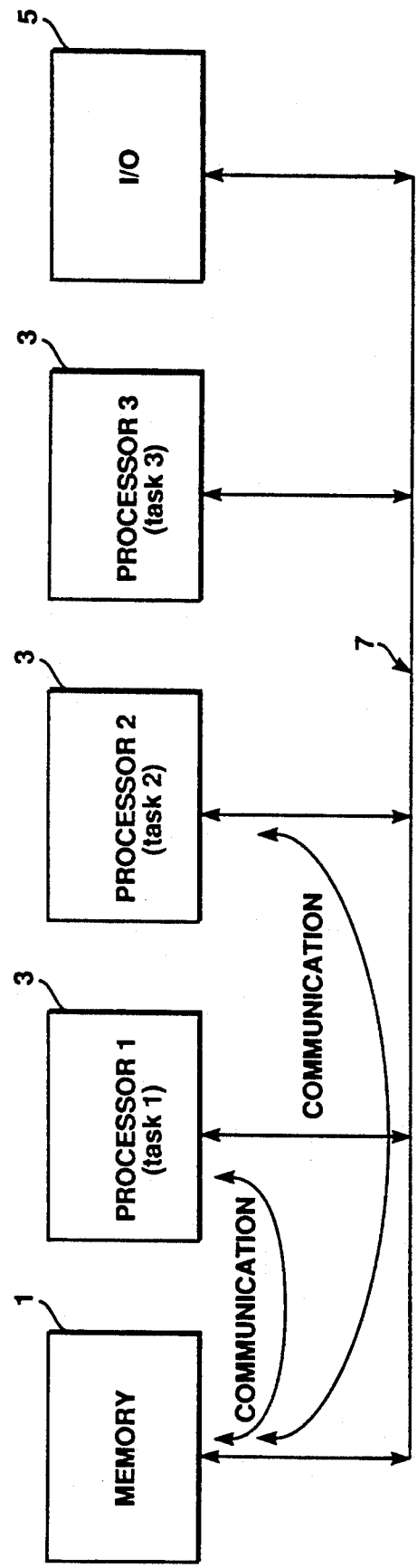
FIG. 2 depicts a prior art tightly-coupled multi-processing architecture.

With reference to FIG. 2, a prior art architecture implemented to handle multiple tasks with multiple processors can be seen. This multiple processor multiple task architecture merely replaced the single large processor with multiple smaller processors 3 connected by a common bus 7 which also connected the processors 3 to the global memory 1 and I/O resources 5. This is known as Symmetric/Shared Memory Multi-Processing (SMP) because the multiple processors 3 all share the same memory 1 (hence the name global memory) and which thus makes the interconnecting bus 7 predominantly a memory oriented bus. This is also known as a tightly-coupled multi-processing architecture because the individual processors 3 are carefully monitored by an overseeing multiprocessing operating system which schedules the various tasks being run, handles the communications between the tasks running on the multiple processors 3, and synchronizes the accesses by the multiple processors 3 to both the global shared memory 1 and the I/O resources 5 to thus avoid collisions, stale data, and system crashes. Of course, having multiple processors 3 attempting to access the same global memory 1 and I/O 5 can create bottlenecks on the bus 7 interconnecting them.

Figure 3:
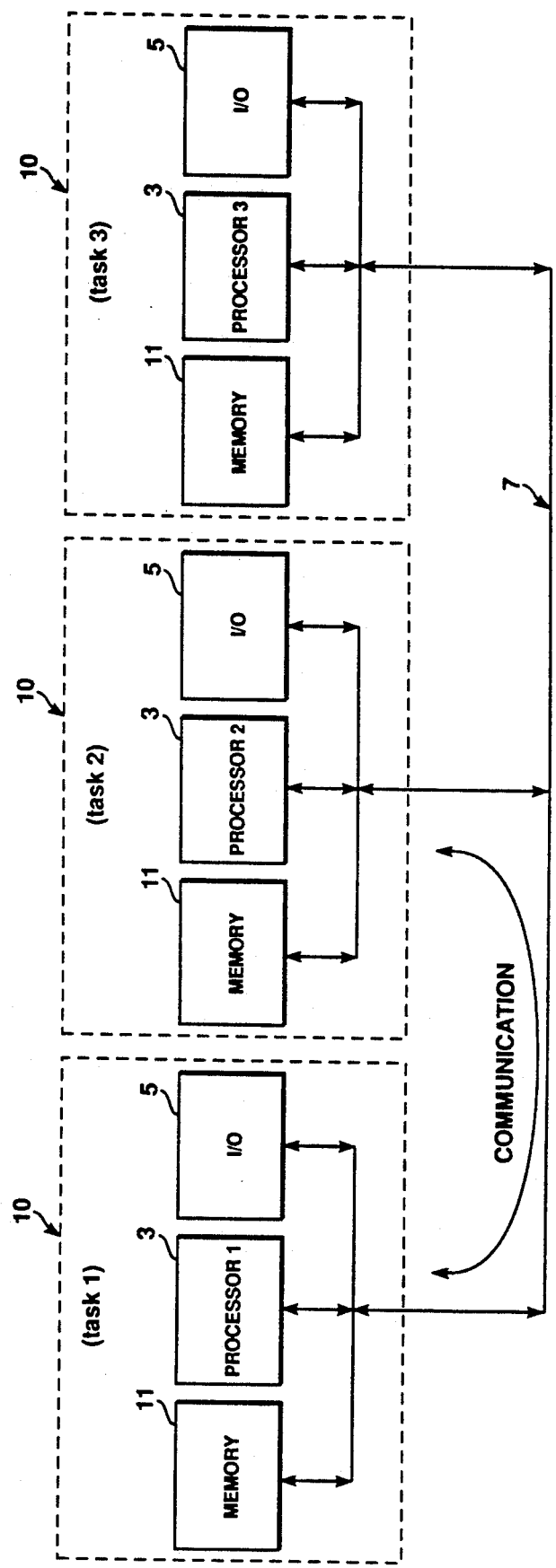
FIG. 3 depicts a prior art loosely-coupled multi-processing/functionally partitioned architecture.

With reference to FIG. 3, an alternative prior art architecture implemented to handle multiple tasks with multiple processors, generally known as either loosely-coupled multi-processing or functional partitioning, can be seen. Rather than have increasingly large individual tasks time-shared on a single large computer or have individual tasks running on separate processors all vying for the same global resources, in a functionally partitioned environment individual tasks are separately run on functional nodes 10, each consisting of a separate processor 3 with its own local memory resources 11 and I/O capabilities 5 all of which are connected by a predominantly message passing bus 7. This is also known as a loosely-coupled architecture because processing can be done within each node 10, including accesses to local memory 11, without concern about activity in other functional nodes 10. In other words, each functional node 10 is essentially a separate processing environment which is running a separate task or job and as such is not concerned about memory 11 conflicts or I/O 5 or bus 7 collisions because no other processor 3 is operating within that particular node's 10 separate environment.

Figure 4:
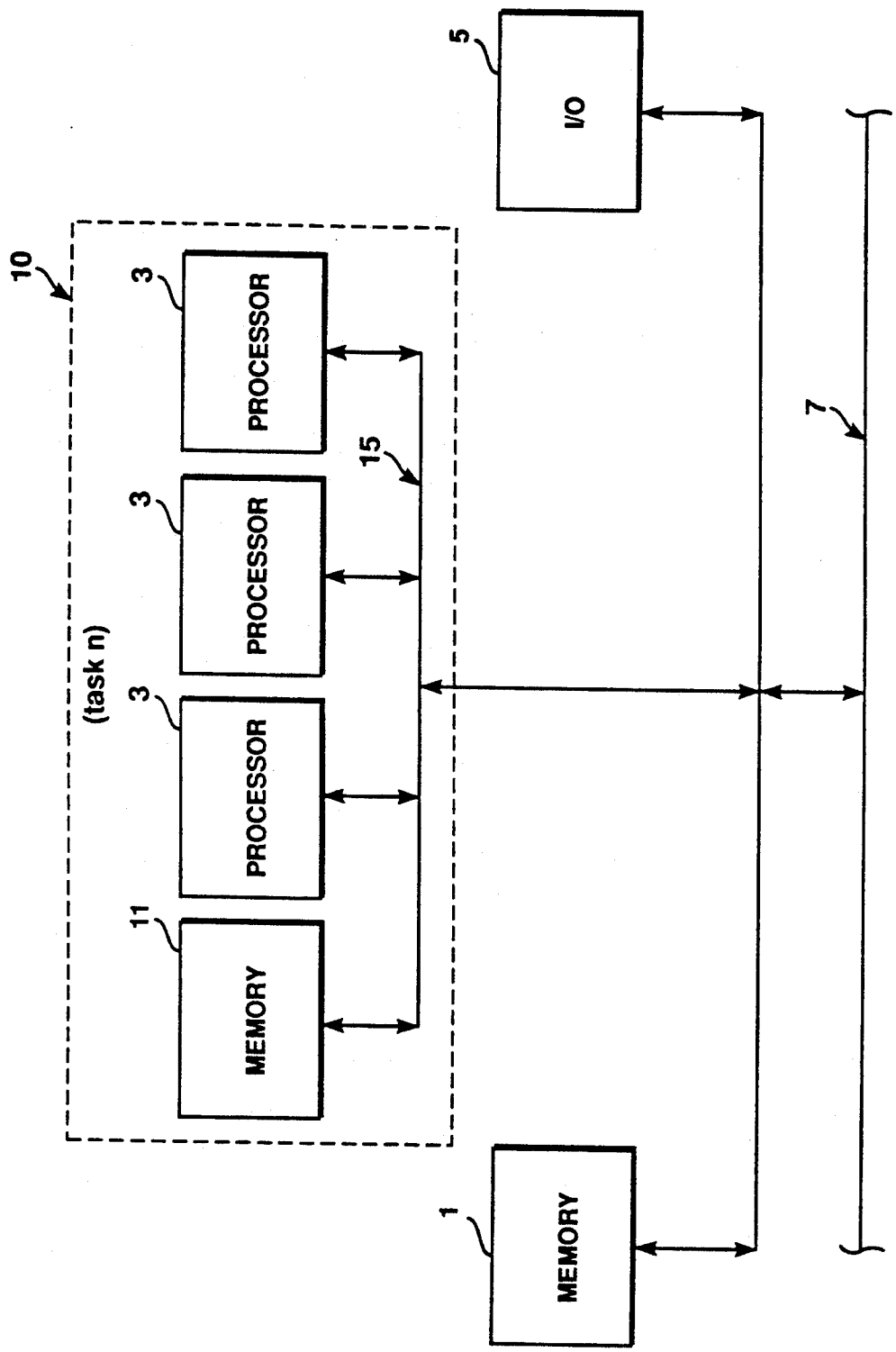
FIG. 4 depicts the architecture of the present invention.

A further refinement of the loosely-coupled multi-processing environment, which is particularly useful when a given task is too large for the single processor 3 used in a functional node 10 of FIG. 3, is replacement of the functional node's 10 single processor 3 with a bank of processors 3, as can be seen in FIG. 4. This bank of processors 3, connected by a predominantly memory oriented bus 15, shares the functional node's 10 local (yet still global in nature) memory 11. In this way, more processing power can be allocated to the task and the functional node is still fairly autonomous from (only loosely-coupled with) other functional nodes. Further, because the processors 3 within each functional node 10 are generally limited to a functional task, bus 15 contention by processors 3 running other functional tasks in other functional nodes 10 is generally eliminated within each node 10.

Therefore, taking a functionally partitioned processing environment (wherein a multi-tasking/timesharing environment is broken down into functional processing partitions or nodes 10) and replacing a functional node's processor 3 with a bank of homogeneous processors 3 to create multiprocessing nodes 10 can provide greater processing power for that functional node's 10 given task(s). Additionally, the "plug compatibility" of functional partitioning (wherein each node 10 need merely concern itself with the interface protocols and can function independently of the format or structure of other nodes 10) can be retained while eliminating the need for highly customized architectures within each functional node 10.

Of course, supporting multiple processors 3 requires, in addition to a multiprocessing operating system, the ability to determine when any given processor 3 will be able to gain access to the bus 15 connecting them in order to access the shared memory 11 and/or I/O resources. In the preferred embodiment of the present invention, this ability to arbitrate between competing processors' 3 accesses to the bus 15 is implemented through a fully distributed scheme, rather than having a centralized arbitrator (which would require additional dedicated logic) as is known in the prior art.

Additionally, as with all processors, an interrupt scheme is necessary to control events other than normal branches within an executing program. Having multiple processors 3 within a node 10 requires the further capability of processor-to-processor interrupts so that one processor 3 can interrupt another processor 3 in order to request it to handle some task, event, or problem situation. In the preferred embodiment, the interrupt scheme is implemented as part of the regular command set and is supported as a normal bus transaction.

Finally, multiple processors 3 reading and writing to a local/global shared memory 11 can cause wasted cycles on the bus 15 connecting them unless the "dead time" spent waiting for a response on a read operation is used by/for another processor 3. A split transaction scheme is thus implemented in the preferred embodiment of the present invention using both ordered and out of order responses, depending upon the usual or expected response time of the data storage medium holding the desired data, thus allowing another processor 3 to utilize the dead time of a typical read operation.

The preferred embodiment of the bus 15 of the present invention provides a high bandwidth, low latency pathway between multiple processors 3 and a global shared memory 11. The pathway 15 handles the movement of instructions and data blocks between the shared memory 11 and the cluster of processors 3 as well as processor-to-processor interrupt communications.

Three types of modules are supported on the bus 15: processor modules 3, I/O modules, and memory modules.

1) Processor Modules

Processor modules 3 can be further broken down into two classes: General Purpose Processors (GPP's) and I/O Processors (IOP's), both of which are write back cache based system processing resources.

The GPP class of processors run the operating system, provide the computational resources, and manage the system resources. The GPP devices are homogeneous (of the same general type or device family) with any task being capable of execution on any of the GPP devices. This allows a single copy of the operating system (OS) to be shared and run on any of the GPP's.

The IOP class of processors provide an intelligent link between standard I/O devices and the cluster of GPP's. The IOP can be any type of processor interfacing with any type of I/O bus or I/O device. External accesses to the cluster of computational GPP resources occur via an IOP. Any IOP in the system can be used to boot an operating system and the boot IOP can be changed between subsequent boot operations.

2) I/O Modules

I/O modules connect to other buses and thus provide a window into I/O resources attached to those other buses using either I/O space or memory mapped I/O. I/O boards are thus slaves to this bus environment and merely provide a link from this bus to I/O boards on other buses. Windows of memory and I/O space are set mapped out of the bus address space for accesses to these other buses. The I/O boards do not, however, provide a direct window from other buses due to cache coherency and performance considerations. Thus, when another bus wishes to access this bus, an IOP is required.

3) Memory Modules

Memory modules connect to the bus to provide high bandwidth low latency access to a global shared memory resource available to all the processors on the bus. The shared memory provides the basis for task sharing between the processors using semaphores, as well as passing data structures using pointers. Local memory may exist on a GPP or IOP module, but it must be private and neither visible to nor shared with other agents on the bus.

Both processor 3 module types, GPP's and IOP's, may contain a cache memory facility. The implemented cache protocol supports write back or write through caching in separate address spaces. All processors 3 connected to the bus 15 should support cache block transfers in the write back cache data space to perform an intervention operation, as is discussed in more detail below.

Arbitration, address/command signals and data communication are overlapped on the bus 15. In the preferred embodiment, the bus 15 has the capability of splitting read transactions into two parts to avoid wasted bus 15 cycles while waiting for a read response. The first part of the split read transaction is the read request and the second part is the resulting read response. This split read transaction sequence allows overlapping the delayed access time of memory 11 accesses (and other relatively lengthy read responses) with the use of the bus 15 by others. Additionally, read responses may occur either "in-order" or "out-of-order" with respect to their associated requests. The in-order mechanism is optimal for deterministic accesses such as memory 11 reads while the out-of-order mechanism accommodates slower responders (such as bus bridges and remote memory or I/O) yet still maintaining high bus 15 utilization/effective bandwidth.

Interprocessor interrupts over the bus 15 provide an urgent communication mechanism. Interrupts can be individually directed or widely broadcast to any or all processors 3 or processor 3 classes in the preferred embodiment. The communication of interrupts occurs by cycle stealing available command cycles on the address bus (part of bus 15) thus avoiding any impact on the performance of data transfers.

Bus 15 initialization support includes test (interrupt and restart), configuration, and bootstrap capabilities. Each module on the bus 15 can be tested either automatically or by operator direction, including fault detection and isolation. Modules contain information regarding their capabilities and allow for system configuration options.

A boot strap processing (BSP) function should exist on the bus 15 to perform the configuration operation and provide the boot of the operating system to the bus 15. The BSP may be a subset of the capabilities of an IOP 3 which could thus perform a BSP on the cluster of processors 3 on the bus 15 via a processor from a connected bus.

The bus 15 architecture is thus a high bandwidth, cache coherent memory bus and in the preferred embodiment of the present invention it is implemented with a synchronous backplane transfer protocol that runs off a radially distributed clock. Information on the bus 15 is transferred between boards on the clock edges with the maximum clock rate dependent on delay from clock to information, bus settling time and receiving latch setup time.

One of the factors that can limit the speed of backplane transfer is the electrical length. A 10 slot backplane is used in the preferred embodiment to minimize the bus 15 electrical length and thus maintain a high backplane transfer speed capability. Thus, only high performance modules should be permitted direct access to the backplane. The architecture permits multiple processor 3 modules to exist on a single board which is achievable using VLSI solutions for caching and bus 15 interfacing.

The protocol has been defined to maximize the percentage of useful bandwidth as compared to raw bandwidth. This is accomplished through quick arbitration, demultiplexed address and data paths (on bus 15) and split transfers among other features.

Figure 5:
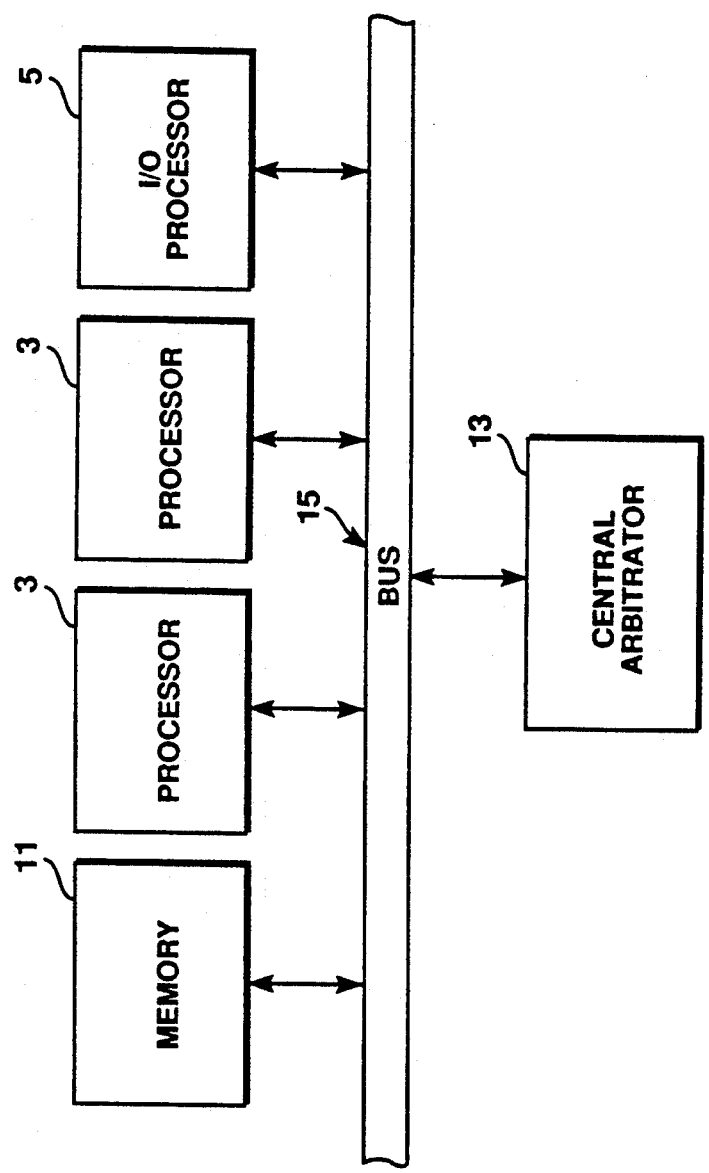
FIG. 5 depicts a central arbitrator architecture of the prior art.

Referring now to FIG. 5, a multiprocessing node using an SMP configuration can be seen. In this particular configuration, a central arbitrator 13 is shown whereby any processor 3 or Input/Output (IO) processor 5 wishing to access memory 11 must first post a request to the central arbitrator 13 on bus 15 in order to do so. The central arbitrator's 13 job is to determine which processor gets access to the local memory 11 in what order. However, use of a central arbitrator 13, while handling contention at memory 11, requires additional logic to handle the specialized arbitration function. This specialized logic can exist as a separate card connected to the bus 15 but this would take up a card space on bus 15. An alternative would be to make arbitrator 13 a portion of the bus 15 logic itself. This, however, makes the bus implementation more complicated and can also make diagnosis and repair of arbitration problems more difficult the more the central arbitrator 13 is integrated into bus 15.

Figure 6:
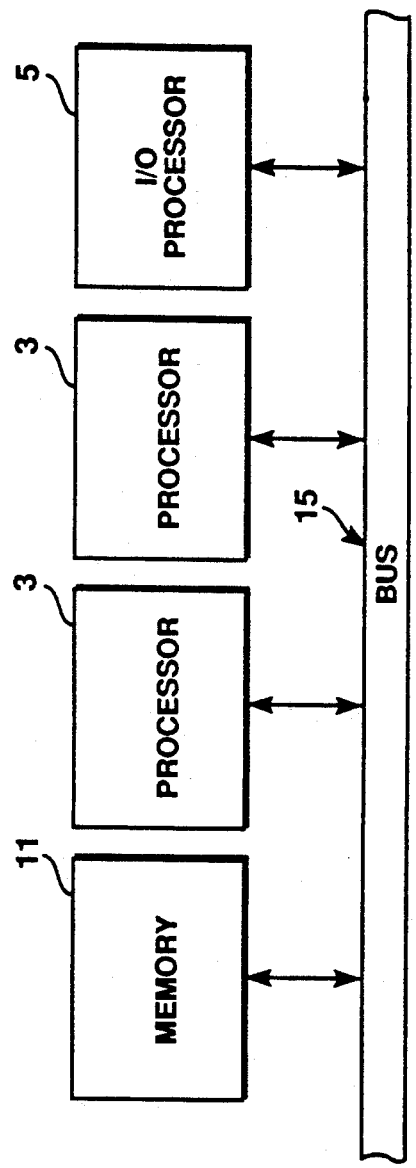
FIG. 6 depicts a functional node of the present invention.

Referring now to FIG. 6, memory 11, processors 3 and IO processor 5 connect to bus 15, in the preferred embodiment of the present invention, where a distributed arbitration scheme is used instead of a central arbitrator. This distributed arbitration scheme allows an individual processor, contending with other processors, to access the local memory 11 by having each processor 3 and IO processor 5 separately and individually handle the arbitration process. This distributed arbitration scheme, although requiring additional logic in each processor card, distributes this function thus simplifying the bus 15 implementation and thus avoids having to use an additional slot to handle the arbitration requirements.

A further advantage of the distributed arbitration approach is the reduction of bus traffic between processors and a central arbitrator. By merely having those processors who wish to access memory 11 contend for that access by handling their own arbitration in a distributed manner, the only additional bus traffic for arbitration is that between processors. This distributed arbitration scheme thus eliminates contention for memory 11 as well as contention for a central arbitrator. The implementation of this distributed arbitration scheme is explained more fully below.

Figure 7:
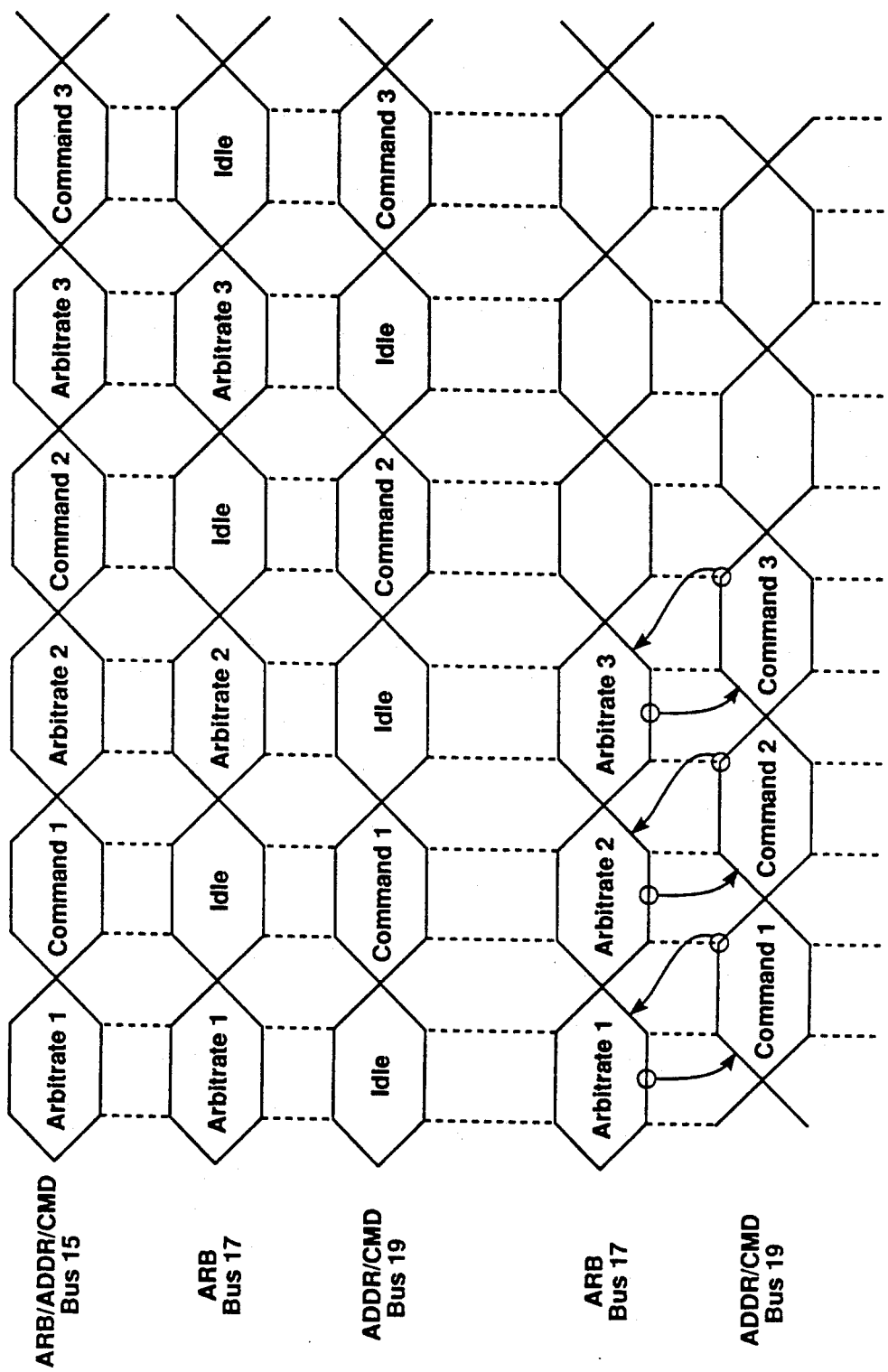
FIG. 7 is a timing diagram of prior art arbitration as compared with the arbitration of the present invention.

Referring now to FIG. 7, timing charts showing various bus implementations can be seen. In the first timing signal, a combined bus which handles all arbitration and any addressing or command signals is shown. This timing signal, depicting a combined bus, shows the sequence of a first processor, wishing to access the bus/memory, issuing command 1 in the next cycle after arbitration 1. Next, a second processor, also wishing to access the bus/memory, issues a command after arbitrating for access, followed by a third, etc.

While this appears to make most efficient use of the bus as there are no idle periods in this sequence, this serial bus arbitration command sequence is not the most efficient methodology. This can be seen by comparing the first time line to the second and third time lines. The second and third time lines represent a separate arbitration bus 17 from an address/command bus 19. In this sequence, in the next cycle after arbitrating on the arbitration bus 17, a command may be issued on the address/command bus 19. This is followed by a second arbitration on the arbitration bus 17 and its associated command on the address/command bus 19.

However, merely splitting the bus into an arbitration bus 17 and an address/command bus 19 not only creates idle times in each of the respective buses it also does not improve performance. Comparing each of these two methodologies to the methodology of the present invention, which is shown by the 4th and 5th timing signals, an improved more efficient methodology can be seen. The 4th timing signal represents the arbitrtion bus 17 and the 5th timing signal represents a combination address/command bus 19 (which are part of the bus 15 of FIGS. 4-6). The difference is that the arbitration bus 17 and the address/command bus 19 are now overlapped or pipelined, as opposed to a straight sequential process as was shown by the 2nd and 3rd timing signals. In this sequence, after the first arbitration has begun and a processor has won that arbitration, that processor may immediately issue a command on the address command bus. Once it is known that a command is about to complete, the next arbitration cycle can begin thus allowing the next arbitration winner to issue a command immediately following the completion of the first arbitration winner's command, and so on vis-a-vis the third arbitration, etc. Please not that in these timing diagrams a single cycle arbitration and a single cycle command has been shown. In the preferred embodiment of the present invention, arbitration is a two cycle process and command issuance requires one or more cycles depending upon such things as the complexity of the command being issued.

Figure 8:
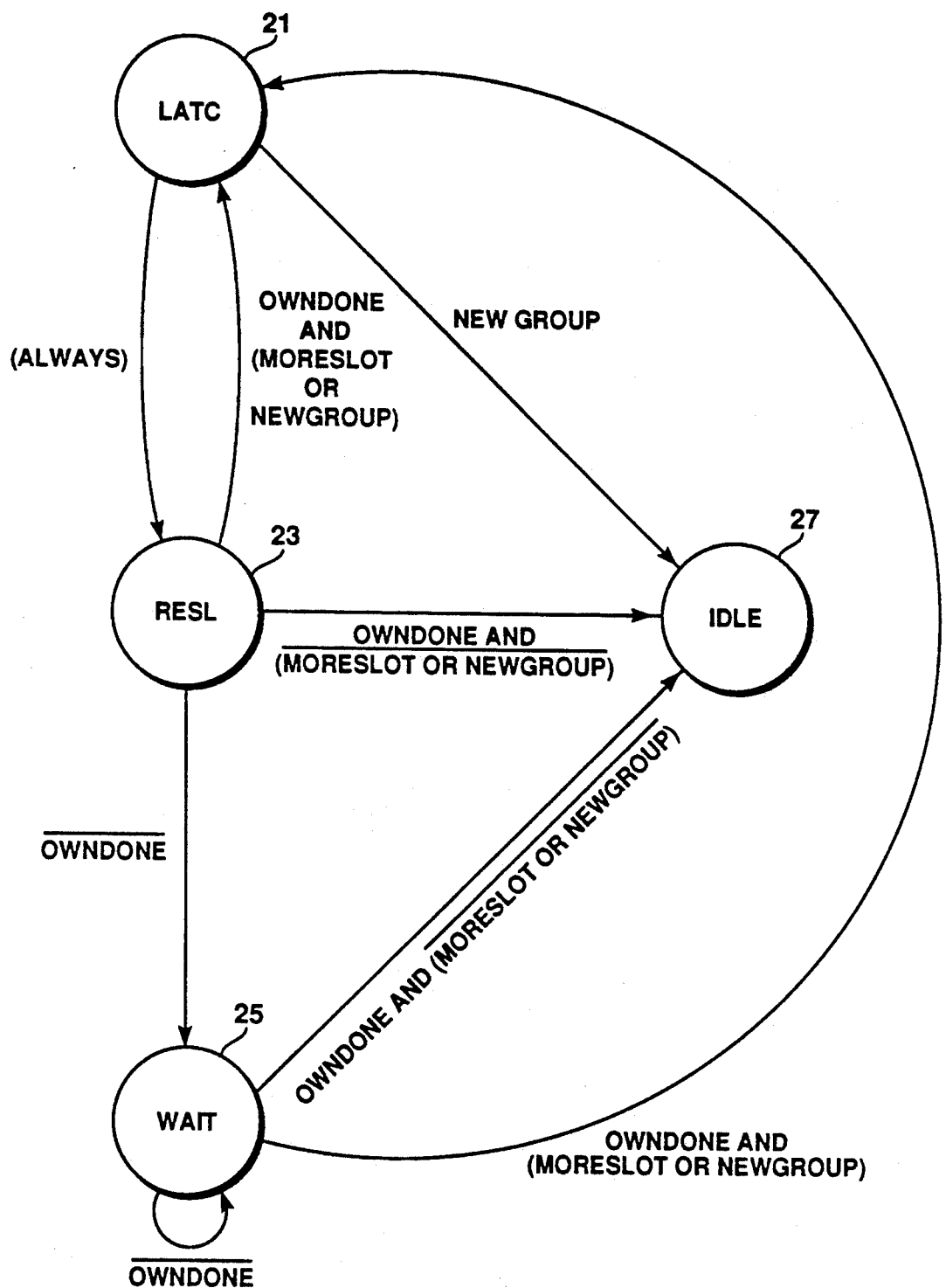
FIG. 8 depicts an arbitration state diagram.

Referring now to FIG. 8, the arbitration process is shown by a state diagram. The arbitration process involves the resolution of contention for bus access among the various processors in an arbitration group. Beginning with an idle condition, state 27, whenever one or more processors wish to access memory each of those processors raises its own arbitration signal. Every processor, in state 21, then inputs all other processor's arbitration signals thus forming an arbitration group by inputting and latching all of the arbitration signals. Following the latch state 21, each of the respective processors in the arbitration group compares its priority to all the other processors in the arbitration group. This comparison is done in the resolution state 23. The winner of this resolution of the arbitration group is the processor whih next issues a command and/or accesses the memory. If this access command sequence is to take more than one cycle then the wait state 25 is achieved. And if this was the last processor in the group to win the arbitration resolution and gain access, then the bus would return to an idle state once the last processor completes its operation. However, if there are more processors remaining in the arbitration group, then following the resolution or wait states all processors return to the latch state 21 and again input all arbitration signals from the remaining processors in the arbitration group. Note that the processors from the group who have already had access are no longer part of the arbitration group and they would no longer be outputting an arbitration signal to request access. The cycle is then repeated through the resolution state, and possibly the wait state, until there are no more processors remaining in the arbitration group. If other processors wish to access memory while the first arbitration group is arbitrating for access, these other processors (and those processors of that earlier arbitration group who have already had access) must wait until the last processor in the present group has completed the resolution state before they can form a new group. This avoids wasting a cycle going through the idle state.

One of the advantages of the present invention is that of providing fairness (equal access over time) to all potential bus contenders. Although one processor may get slightly faster access in a given arbitration group due to that processor's arbitration priority, by using the arbitration group approach each processor is assured of fairness. On the average, a request would only have to wait for the duration of one group resolution time before being granted bus access. In this way, no processor should have to endure starvation.

Figure 9:
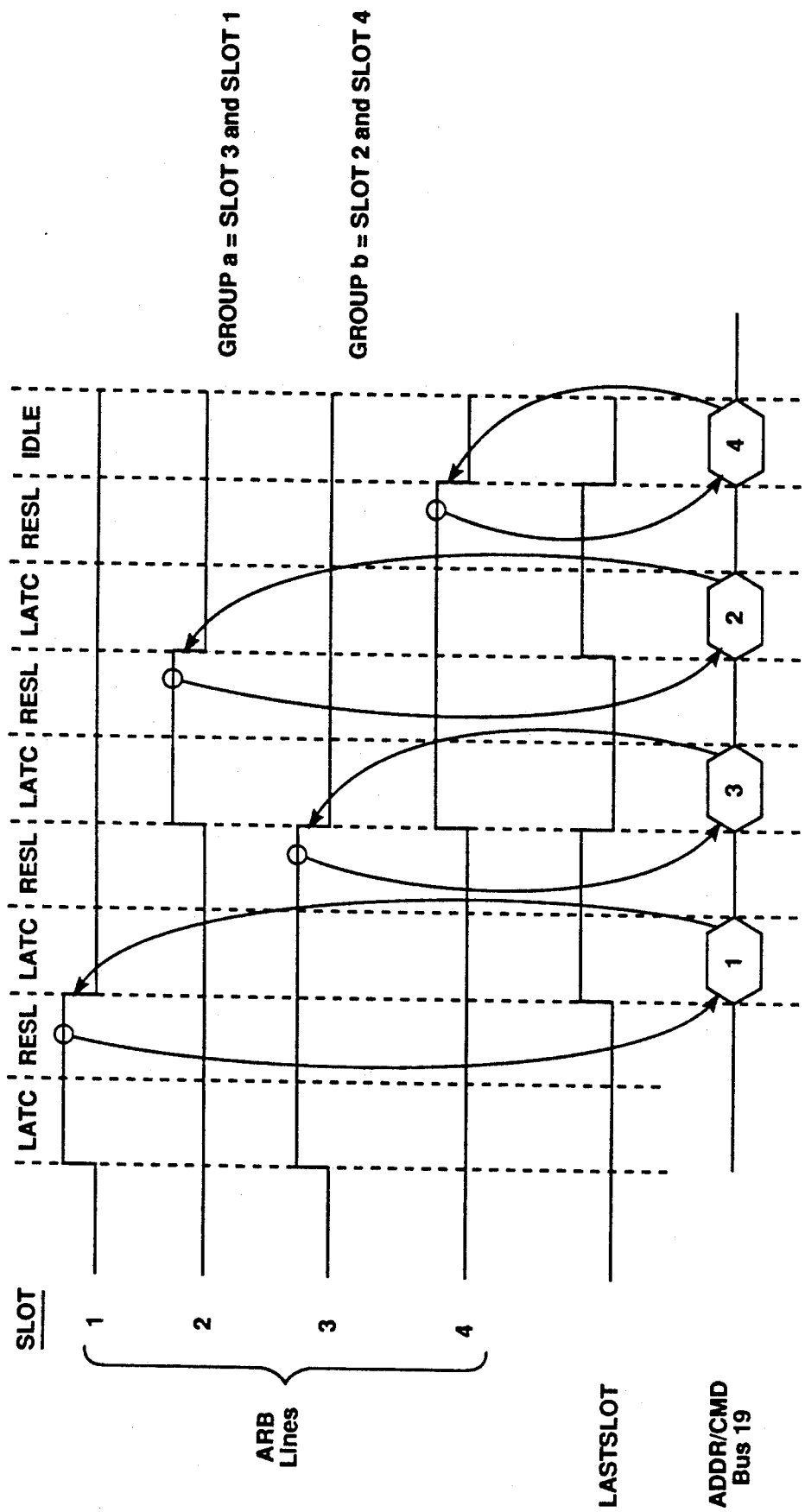
FIG. 9 is a timing diagram of the new arbitration group formation.

Referring now to FIG. 9, a timing diagram is shown which represent four different processors all potentially contending for bus and/or memory access. Each of the signal lines 1 through 4 represent one of the processors. The 5th signal line is a logical representation of when the last processor in an arbitration group is resolving its arbitration (LastSlot). The 6th line is the address/command bus 19 whereby commands are issued following arbitration.

Reviewing the arbitration sequence shows signal lines 1 and 3 raised in the first cycle. This means that processor 1 and processor 3 both wish to access the bus and/or memory and have indicated this desire by outputting an arbitration signal. All processors then input and latch these arbitration signals and all of those within the group, namely 1 and 3, go through the resolution state to determine who gets access. In this case processor 1, having a higher priority than processor 3, first gains access through the arbitration resolution and issues a command on the address/command bus 19. While this command is being issued, due to the pipelined operation of this arbitration scheme, processor 6 and all the other processors input and latch all of the arbitration signals. Additionally, as in discussed below with reference to the interrupt protocol, the last arbitration winner is saved by each processor.

Now, because it is only processor 3 who is outputting an arbitration signal, processor 3 wins the following arbitration resolution and can then issue a command in the following cycle. Simultaneously with this resolution, due to LastSlot being logically raised as is shown by the 5th timing signal, any other processor wishing to form an arbitration group may then raise their arbitration signal in the next clock cycle. However, please note that LastSlot is merely a signal generated internally by each agent and is not actually a separate signal line as is depicted in FIG. 9. In this example, processor 2 and processor 4 who now wish to access memory, raise their arbitration signals and go through a latch input, latch resolution arbitration cycle in order to issue their commands or access memory.

Note that LastSlot is merely the condition whereby the last processor in an arbitration group is latching in and resolving its own arbitration signal. Last slot equals the logical sum of the parts comprising the equation: $(\overline{1}\cdot 2\cdot\overline{3}\cdot 4)+(\overline{1}\cdot\overline{2}\cdot 3\cdot\overline{4})+(\overline{1}\cdot 2\cdot\overline{3}\cdot\overline{4})+(1\cdot\overline{2}\cdot\overline{3}\cdot\overline{4})$. Stated differently, new group formation may occur if the arbitration bus is either idle or the arbitration sequence is either in a resolution or wait state and the LastSlot condition exists.

In the preferred embodiment of the present invention, to support the split transaction read response protocol as is discussed in more detail below, there are additional considerations before an arbitration winner can issue a command on the address/command bus 19. Once a processor has won in arbitration, if the processor is trying to issue a command which does not require access to the data bus (a separate bus to handle data transfers, as is discussed below with reference to the split transaction protocol), then the processor is free to issue the command. However, if the processor is trying to issue a command which does require access to the data bus then the processor must take the additional step, beyond arbitration, of ensuring that the data bus is available. This extra step, really comprising two steps, is to first check to see whether the Data Strobe (DS) signal is asserted (thus indicating that the data bus is busy handling a prior transaction), and secondly, to check to see whether the Ordered (ORD) response signal line is asserted (thus indicating that an ordered split read response is pending). See the discussion below for when and how the ORD signal gets asserted. Once both the DS signal and the ORD signal are not asserted, the processor is free to issue a command on the address/command bus 19 and, after asserting the DS signal line, can then transmit data on the data bus.

Figure 10:
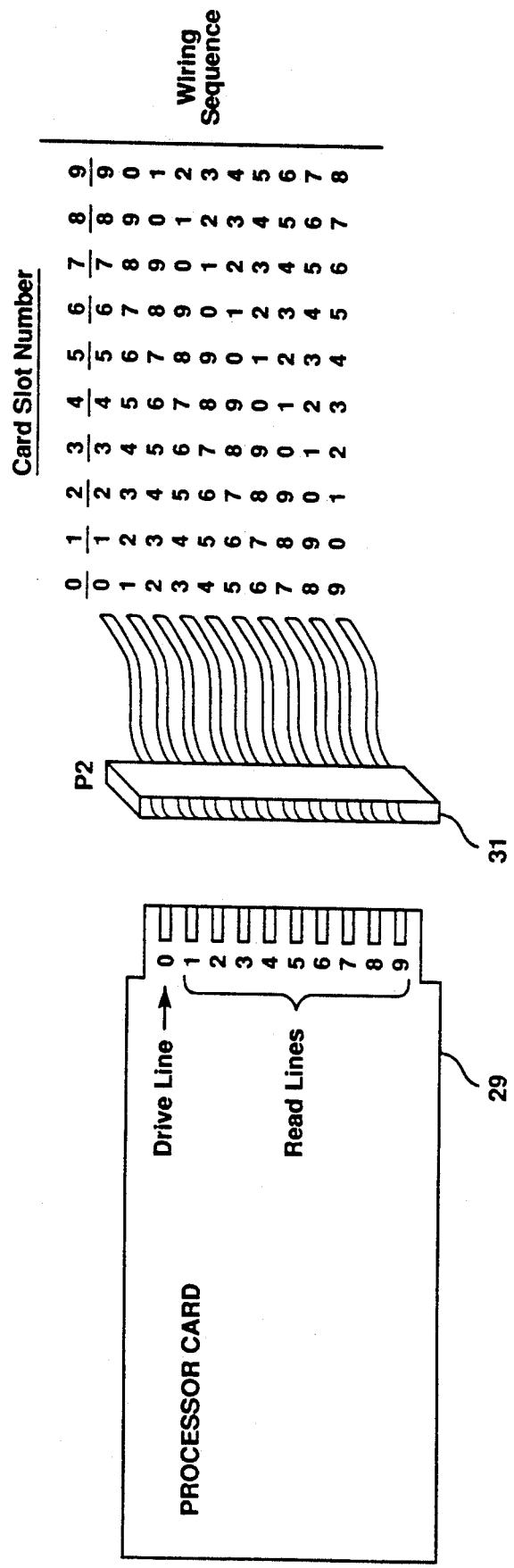
FIG. 10 depicts a card and a slot connector to show the arbitration signal lines as well as a table to illustrate the rotation of the arbitration signal lines from one slot to the next.

Referring now to FIG. 10, in the preferred embodiment of the present invention multiple processors exist, each residing on a card which fits into a slot in the back plane which makes up the bus of the system. In order for each processor to be able to resolve arbitration, it must know of each other processor in an arbitration group. Thus, each processor in an arbitration group must be able to discern each other processor in the arbitration group. The way this is handled in the preferred embodiment of the present invention is for each processor to output a distinct arbitration signal when it wishes to arbitrate to gain access to the bus and/or memory.

To arbitrate for bus access, each processor asserts the first signal line on the card and inputs the other remaining arbitration signal lines. Then, in one embodiment of the present invention because the back plane connector signal lines are rotated, each card is asserting its own respective signal line across the back plane to all the other cards on the bus. This is shown in FIG. 10 by having processing card 29 assert signal line number 0, when it wishes to arbitrate for access, and inputs lines 1 through 9 to determine which other processors are vying for access. Processor card 29 plugs into connector 31 of back plane P2. Connector 31 has ten signal lines, each of which is rotated one position as compared to its neighboring slot connector. Thus, in the table to the right of FIG. 10, processor card slot number 0 has the first signal line connected to connector 31, wire 0, while processor card slot number 1 has the first signal line connected to connector 31, wire 1, etc. In this way, each processor/card can assert the same signal line on the processor/card yet other processors/cards see the output signal on a different input signal line. This relative positioning determination is made at reset time by having the 1st processor card assert its signal line. Each processor card then inputs this signal and by determining its relative position can thus determine which position the processor card is in.

Stated differently, each processor card obtains an arbitration priority by determining which signal line is being driven. Thus, arbitration priority is determined by which slot the particular processor card is located in. Of course, in an alternative embodiment, the arbitration priority could be software assigned or could even be assigned in a round robin fashion.

An alternative embodiment of the arbitration signal line scheme is to include a slot marker signal line along with the rotated drive signals. This slot marker signal line would thus indicate relative positioning upon system start-up and would thus provide priority positioning information.

A still further alternative embodiment, rather than rotating the signal lines, is to merely rotate a slot marker signal line within the signal set such that it appears adjacent to the Nth position for the Nth card. Again, the slot marker signal line would provide priority positioning information but would only require rotating the slot marker as opposed to the entire set of arbitration signal lines (of course, as the slot marker signal line is rotated from one position to the next, the adjacent arbitration signal lines would have to shift back and forth to make room for the slot marker signal line). In this embodiment of the present invention, when the card in slot X wants to arbitrate for bus access, the card would assert the Xth slot signal line.

Table 1 shows the positioning of the signal lines in a four slot implementation for all three alternative embodiments discussed above. Note that DRV indicates the signal line to be driven when a processor/slot wishes to arbitrate for bus access and that SLM indicates the slot marker signal line.

TABLE 1

|  | SLOT 3 | SLOT 2 | SLOT 1 | SLOT 0 |
|---|---|---|---|---|
| EMBDMT. 1: | A3 (DRV) | A2 (DRV) | A1 (DRV) | A0(DRV) |
|  | A2 | A1 | A0 | A3 |
|  | A1 | A0 | A3 | A2 |
|  | A0 | A3 | A2 | A1 |
| EMBDMT. 2: | A3 (DRV) | A2 (DRV) | A1 (DRV) | A0 (DRV) |
|  | A2 | A1 | A0 | SLM |
|  | A1 | A0 | SLM | A3 |
|  | A0 | SLM | A3 | A2 |
|  | SLM | A3 | A2 | A1 |
| EMBDMT. 3: | SLM | A3 | A3 | A3 |
|  | A3 (DRV) | SLM | A2 | A2 |
|  | A2 | A2 (DRV) | SLM | A1 |
|  | A1 | A1 | A1 (DRV) | SLM |
|  | A0 | A0 | A0 | A0 (DRV) |

Figure 22:
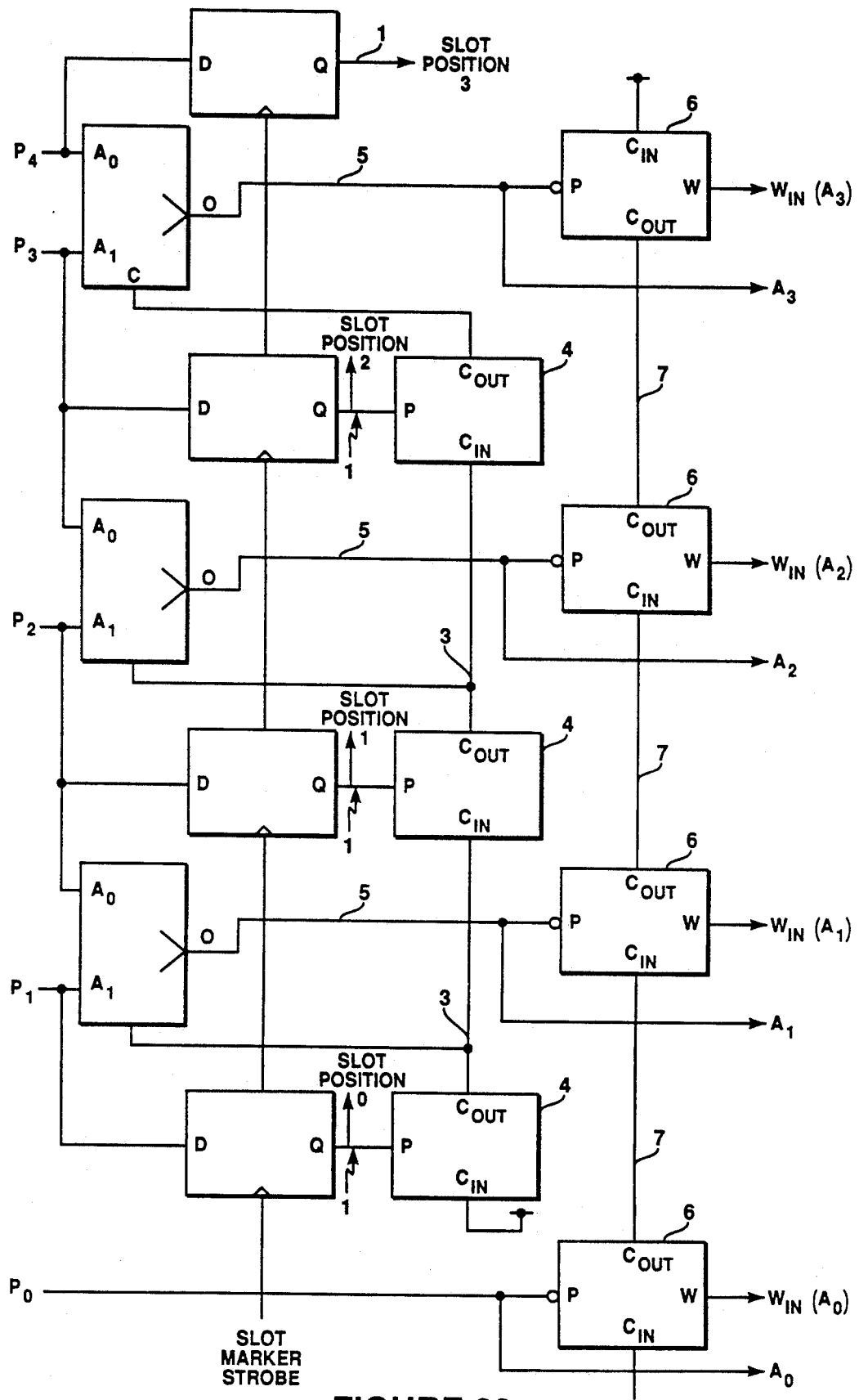
FIG. 22 is a logic diagram of the arbitration priority determination and resolution circuitry for the third alternative embodiment of the present invention.

FIG. 22 further reviews the third alternative embodiment. Note that although the implementation of FIG. 22 addresses a 4 slot configuration, the approach used is equally applicable to an N slot backplane configuration.

With reference to FIG. 22, wherein the implementation shown utilizes active low logic, during system reset time SLM is made active by being set at a fixed level of logic 0. Then, still during system reset time when all driven arbitration requests are in-active, an internal Slot Marker Strobe signal is generated. The Slot Marker Strobe signal is used to sample the state of the arbitration signal lines. The state of the arbitration signal lines (of which only one is active at system reset time) indicates the slot position (priority) of each particular card/agent, as was discussed above. Each board can thus determine its slot position and hence its priority by signal line 1.

The sampled signals output from the latches (D flip flops) are used to control the propagation of a control signal line 3 via logic 4 (which is comprised of the logic $C_{out}=C_{in} \cdot P$) to control input multiplexors 2 (which are comprised of the logic $O=A_1 \cdot C + A_0 \cdot \overline{C}$). These multiplexors 2 are used to bypass the SLM and generate the lines 5.

The agent $W_{in}$ signals are determined by the state of the arbitration signal lines during the time of sample and the propagation of a control signal through logic 6 (which is comprised of $C_{out}=C_{in} \cdot P$ and $W=C_{in} \cdot \overline{P}$). The propagation signal 7 stops at the highest priority agent that is requesting the bus resource/access. Thus, only the highest priority winner need be decoded.

One advantage of this embodiment of the present invention is the small amount of logic necessary to implement the arbitration methodology. This small amount of logic translates into fast arbitration sequences which is important with multiple processors vying for access to the bus.

Figure 23:
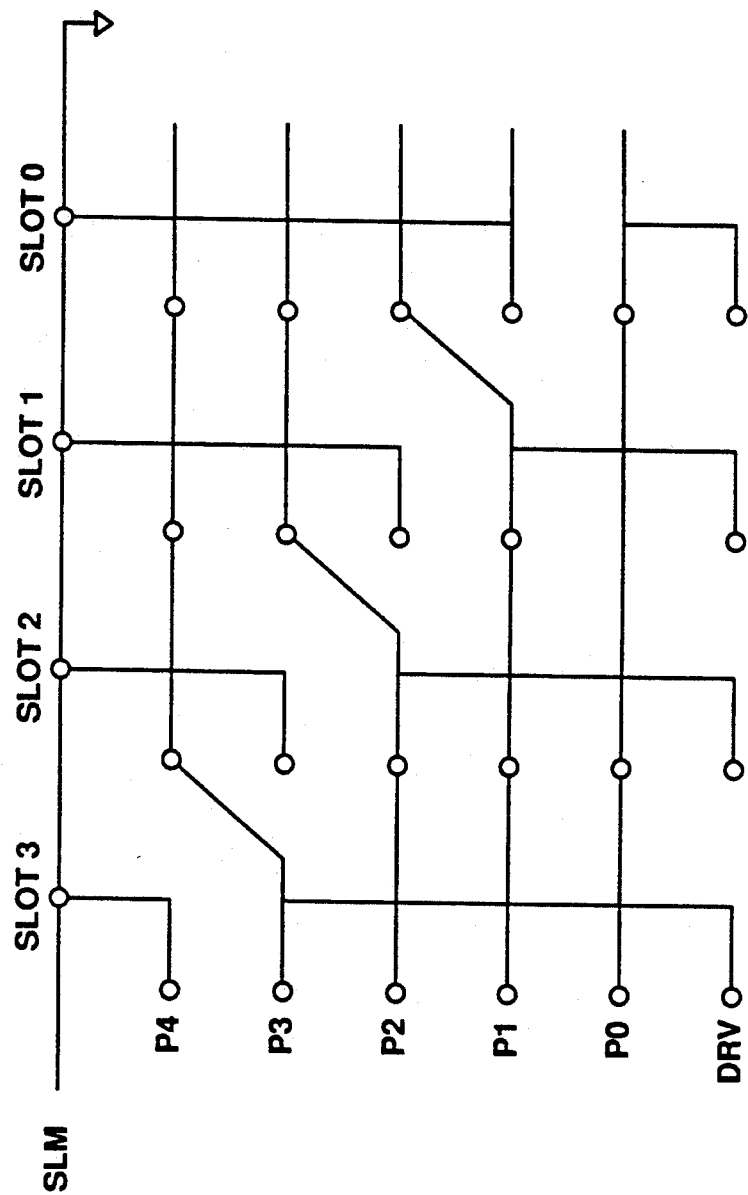
FIG. 23 depicts the backplane configuration with slot marker for the third alternative embodiment of the present invention.

Referring now to FIG. 23, the backplane configuration with slot marker (again, with four slots but N slots being possible) for the third alternative embodiment can be seen. Note that, again, with this implementation, the signal lines themselves are not rotated. The DRV pin is used by all agents and is asserted to request bus resource/access. Note that for each slot position the DRV pin is connected to a different line, as was indicated by embodiment 3 of Table 1.

Referring now to a typical write operation, the write command is issued with data immediately following. Stated differently, a write command (including a location address) is immediately followed by the data to be written to that location. Because the address and data are transmitted sequentially, with no intervening steps taken, there are no cycles wasted while waiting for the data to be transmitted.

Figure 11:
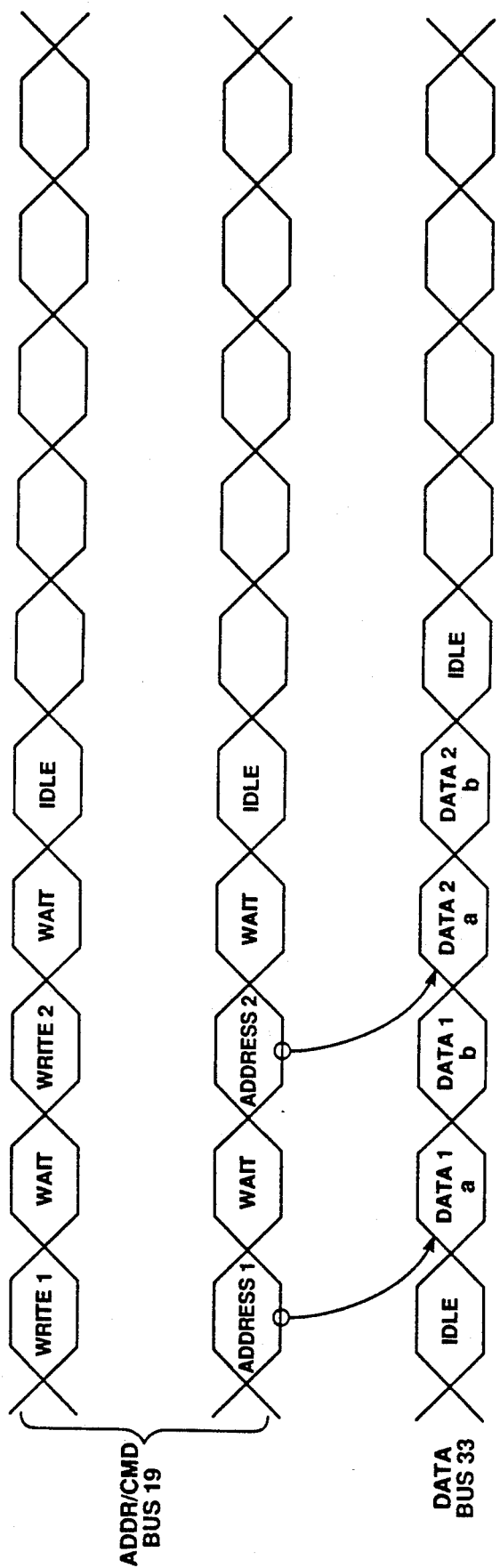
FIG. 11 is a timing diagram of a two write write operations.

Referring now to FIG. 11, a write operation is shown using timing diagrams. The first two timing signals represent the combined address/command bus 19 and the third timing signal represents the data bus 33, utilizing separate buses for separate functions in the preferred embodiment of the present invention. Following any arbitration that may be required to facilitate contention for access to these buses, a first write command is shown being issued on the address/command bus 19 simultaneously with the address of the location being written to. In the next cycle, the data which will be written to this location is transmitted on the data bus 33 (also part of the bus 15 of FIGS. 4-6), and continues to do so for the number of cycles necessary to transmit all of the data to be written.

After all the data has been transmitted and written to the location desired the write operation is finished and another command, such as a second write command as shown in FIG. 11, may be executed. Further, with separate buses, one for the command and address and another for the data as in the preferred embodiment of the present invention, a later command may be issued simultaneously with the last cycle of data transmission of a prior command in a pipelined fashion to thus more efficiently utilize the address/command bus and the data bus.

As is also shown by FIG. 11, with a write operation the only idle time that exists on the data bus 33 is that which occurs either while the write command (and the address) is being issued or during any idle time when no commands are being issued at all.

Figure 12:
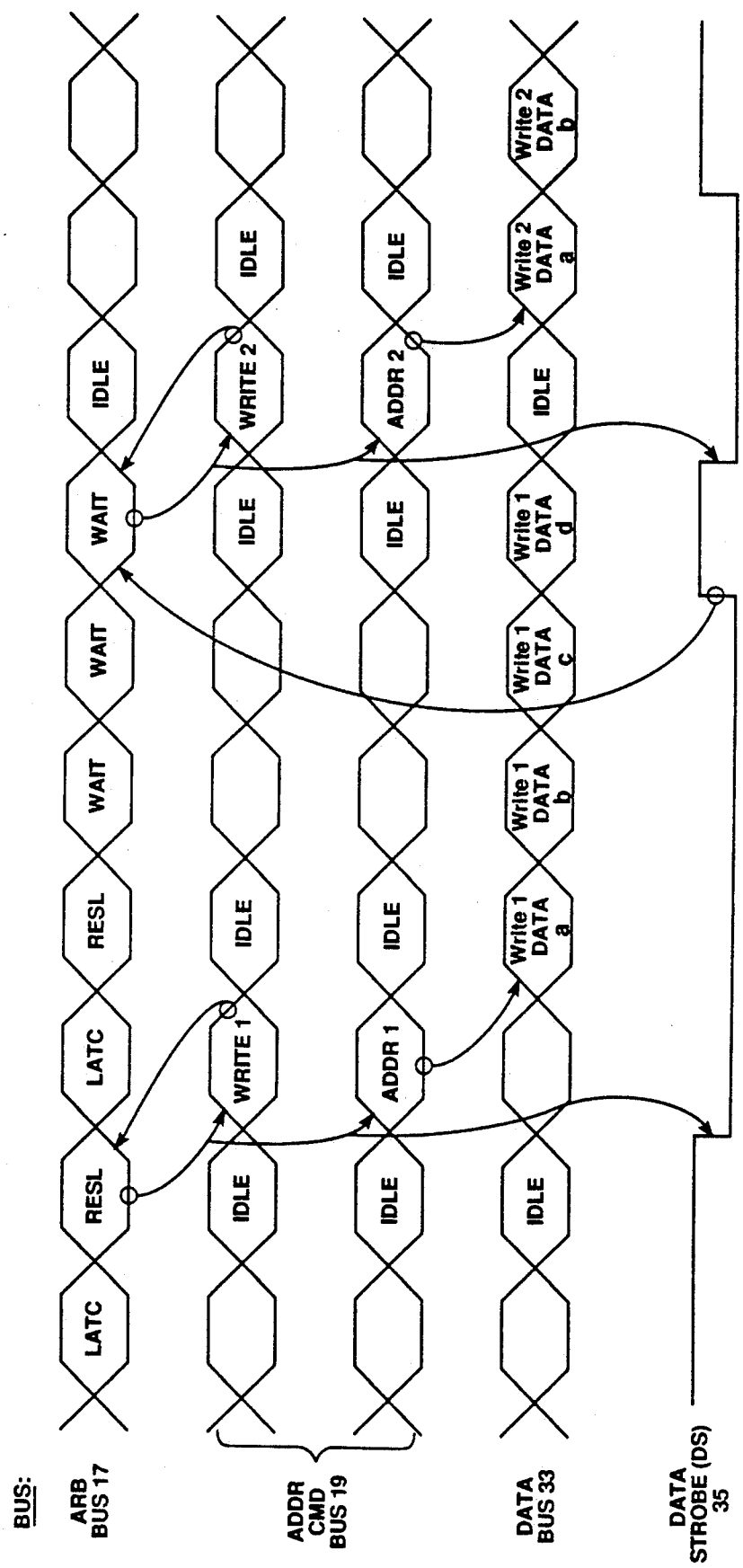
FIG. 12 is a more detailed timing diagram of two consecutive write operations.

Referring now to FIG. 12, a more detailed timing chart of two consecutive write operations in accordance with the preferred embodiment of the present invention is shown. The first timing signal is an arbitration bus 17 which handles any contention for access to address/command bus 19 and, indirectly, access to data bus 33. In this example, after an arbitration cycle of first latching all contenders and then resolving the winner of access, a first write command and address is issued on the address/command bus 19 as shown by the second and third timing signals. Simultaneously with issuing the write command, because the data bus 33 will be needed to do the write operation, the data strobe signal 35 (the fifth timing signal) is lowered to warn everyone else that the data bus 33 is in use. In the next cycle following issuance of the write command and address, the data to be written is transmitted on the data bus 33 (the fourth timing signal) until all the data is written which in this case requires four cycles.

Following the first arbitration cycle, a second arbitration cycle of latching all contenders and resolving the winner of access to the address/command bus 19 occurs. This arbitration cycle results in a second write operation ready to be issued. However, because a write operation requires immediate access to the data bus 33, which is not available until the data strobe signal 35 returns to its normally high state, and the ordered read response (ORD) signal is not being asserted (as is discussed in more detail below), this second write operation must wait. When the first write operation is one cycle away from completion, it returns the data strobe signal 35 to its normally high state and the second write can then issue its write command and address on the address/command bus 19 in the next cycle. The second write command must also lower the data strobe signal 35 in that next cycle in order to block out other potential users of the data bus 33. After the command, address, and data strobe signals are issued, the data to be written is transmitted in the next cycle and continues until all the data is written which in this case requires two cycles. Again, one cycle before the data is completely transmitted, the data strobe signal 35 is returned to its normally high state, this time by the issuer of the second write operation, thus releasing the data strobe signal 35 for use by others.

As opposed to a typical write operation, there is usually an inherent wastefulness with a prior art read operation. In the prior art read operation, as is discussed below with reference to FIG. 13, the read command is issued along with the address of the location to be read, and then there is usually a period of delay while waiting for a response from the device containing the data to be read. During this delay period, the data bus is sitting idle yet is not available for use by others.

Figure 13:
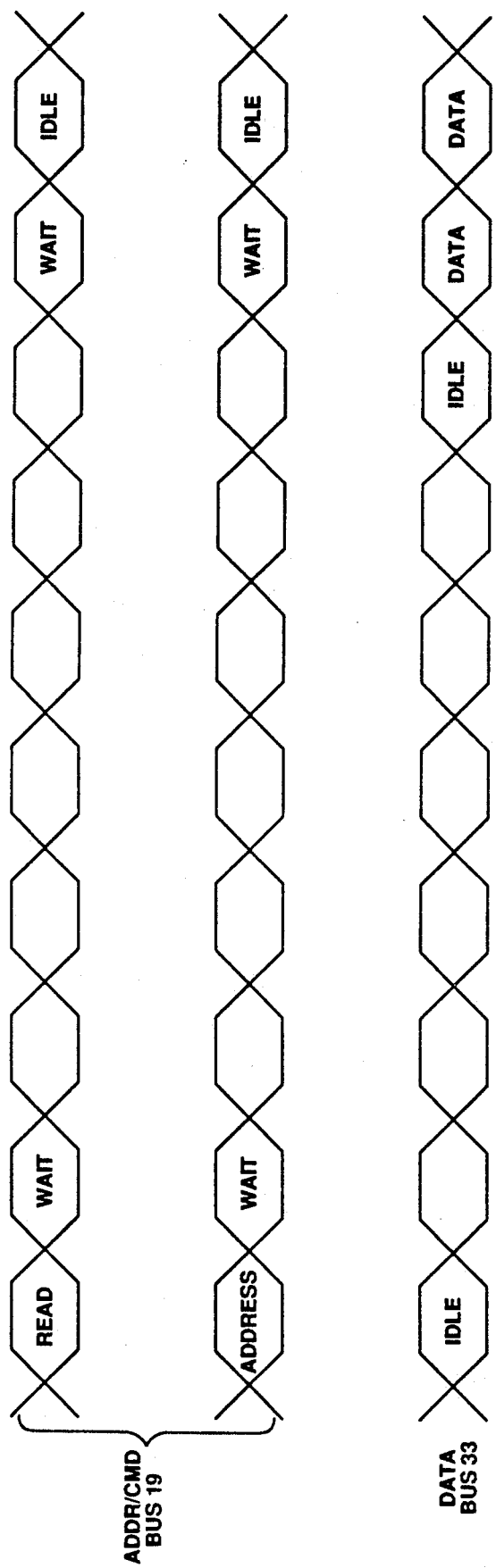
FIG. 13 is a timing diagram of a prior art read operation.

Referring now to FIG. 13, address/command bus 19 and data bus 33 are shown handling a prior art read operation. Following any arbitration that may be required to facilitate contention for access to these buses, a read command is issued on the address/command bus 19 simultaneously with the address of the location to be read. Then, due to the delay while waiting for a response to the read command, the data bus 33 is tied up yet sits idle for a number of cycles. If the data being read is located in a relatively fast device (as compared to the speed of the processor issuing the read command, e.g., local global memory), then this delay may be relatively short. Conversely, if the data is located in a relatively slow device (e.g., remote memory, I/O, across a bus bridge), then this delay can be considerable. In either case, the delay locks out the data bus which is sitting idle during this period of waiting.

One approach to improving efficiency of data bus utilization is to use a split transaction scheme. A split transaction scheme takes a typical read operation and separates it into two parts: one part is the read command, with its associated address, and another part is the later read response. One advantage of a split read transaction scheme is that it can release the data bus during the intervening period between the read command and the resulting read response thus allowing others to utilize it.

Figure 14:
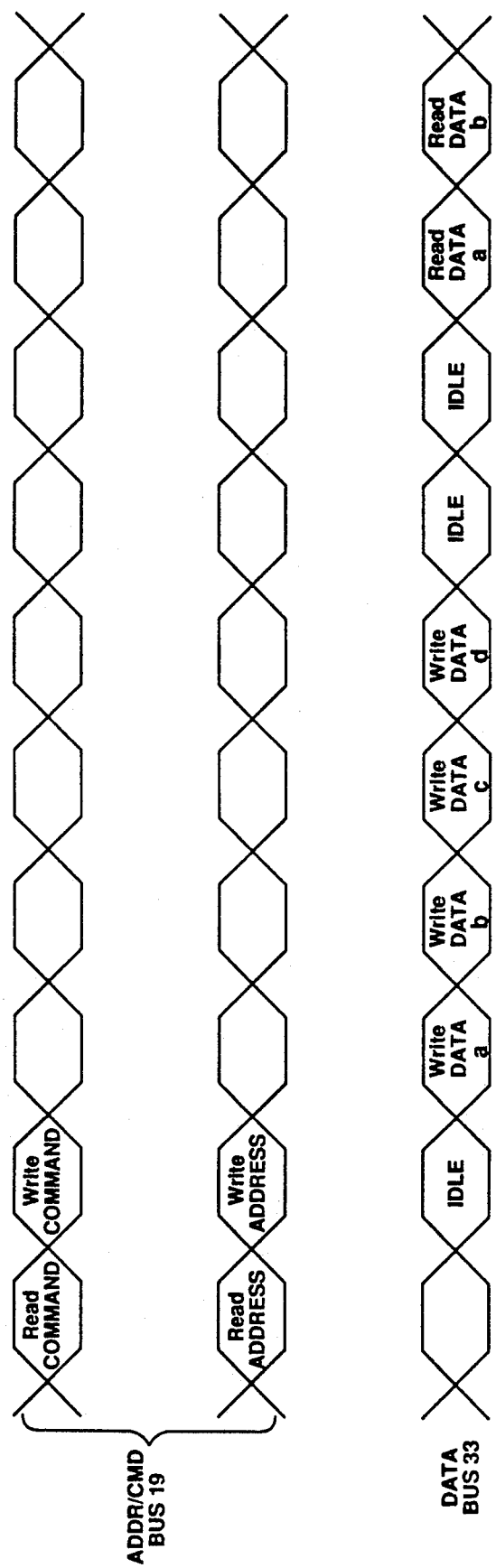
FIG. 14 is a timing diagram of a read operation and a write operation.

Referring now to FIG. 14, a read command and location address is issued on the address/command bus 19. After the command and address are issued, the address/command bus 19 and the data bus 33 are then released for use by others. In this example, a write command and location address is then issued on the address/command bus 19 immediately followed by transmission on the data bus 33 of the data to be written. After the write operation has completed thus releasing the data bus 19, and after the device responding to the read request is ready to transmit the data, the read data is transmitted on the data bus 19.

However, when the device containing the requested data is ready to respond to a read command, the data must somehow be marked for or addressed to the requesting device. A tag or identification marker is one way to tell the responding party who the requesting party is. In that way, when the responding party sends the requested data, the data can be earmarked for the particular party who requested it.

In the preferred embodiment of the present invention the responding device determines who the read command issuer/device is from both the arbitration sequence which resulted in the issuance of the read operation and from an identification field in the read command which contains additional source information in the case of multiple potential issuing sources per device or slot. Because the arbitration sequence in the preferred embodiment includes each device remembering the very last arbitration winner, the issuing device is known by each other device (including the device which will respond to the read command). And if each device located in a slot on the bus has multiple potential modules on it (each of which could issue a command), the read command would itself state the module which issued the command. In this way, both the issuing device (slot) and the particular module on the device would be known by the responding device. Note that this embodiment is preferable to having each read command contain a designator indicating both the device/slot and the module which issued the command because that would require more bits in the read command itself which would require either a larger bus size or another cycle to transmit the larger command.

In the preferred embodiment of the present invention, the device responding to the read command will respond in one of two ways. If the responding device is a relatively slow device, after acknowledging the read command with an out-of-order (OOR) response signal, the responding device merely arbitrates for access to the command/address bus 19 like any other command issuer and then issues a read response command with the data immediately following (once it is determined that the data bus is available), much like a typical write operation. This is known as an out-of-order (or out-of-sequence) read response since the response can occur at any time, with no relation to when that read command or any other read command was issued.

As compared to an out-of-order response, in the preferred embodiment of the present invention, if the device responding to a read command is a relatively fast device, the responding device will respond in an ordered (or in-sequence) fashion. When the responding device is ready to respond with the requested data, the responding device first checks to see if the ordered (ORD) signal is asserted, indicating that there is already an ordered response pending. If the ORD signal is not asserted, the responding device asserts the ORD signal indicating it's readiness to transmit the read data, otherwise the responding device must wait until the ORD signal is no longer being asserted before asserting the ORD signal. Next the responding device checks to see if the data strobe (DS) signal is asserted, indicating that the data bus is busy. If the DS signal is not asserted, the responding device can stop asserting the ORD signal and can begin asserting the DS signal, otherwise the responding device must wait until the DS signal is no longer being asserted before disasserting the ORD signal and asserting the DS signal.

Using the ORD signal avoids having the responding device wait for the next arbitration group to form in order to respond with the read data. Using the ORD signal also facilitates blocking out any write operations which might be issued in the current arbitration group, at least until the ordered read response is complete, because in the preferred embodiment of the present invention write operations (and ordered read responses) first check the ORD signal line before issuing write commands. In this way, fast responders can respond quickly, can penetrate long sequences of write operations, and can maintain the proper sequence of read commands to read responses for data held in relatively fast devices.

The interrupt protocol of the present invention provides for interprocessor communication with less bus traffic and fewer specialized resources than memory based systems (e.g., semaphores, queues, tables, etc.). The interrupt protocol of the present invention uses the address/command bus and the data bus, as earlier discussed, as the hardware mechanism to provide interrupt communication between the processors in the system. This mechanism supports the requirement of signalling from a processor (GPP or IOP) requesting an interrupt to a processor (GPP or IOP) responding to the requested interrupt.

In the preferred embodiment of the present invention, interrupts can occur based on priority, as a Non-Maskable Interrupt (NMI), a processor reset, or a system reset. Interrupts are sent from a single resource (processor) but may require service by a specific resource, any resources of a class, all resources of a class, or all resources in the system. Interrupts using any of these types of destinations can be sent on the address/command bus.

An interrupt requesting that a specific resource respond is used whenever a specific resource is needed. The resource could be unique in some way (e.g., it is the only IOP connected to a certain disk device) or maybe the resource is known to be particularly capable of handling the request.

A request for handling by any processor in a class could be used, for instance, by an IOP to post the completion of an I/O service function where any GPP could handle the resulting service. When this destination scheme is used one and only one of the resources capable of handling the interrupt would respond with an IPA command, as is explained more fully below.

A request to all resources in a class could be used to post specific data needed by only those in that class of resources in the system. An example would be the loss of an I/O resource being signalled to the GPP class of processors.

A request to all resources in the system could be used to post specific data needed by all resources in the system. An example would be a power failure condition or the loss of another system resource.

Thus, to repeat, interrupts can be sent from any processor type to any processor type. Interrupts may be directed to a specific processor in the system, or may be broadcast to a class of processors, or may be broadcast to all processors in the system. Thus, the interrupt scheme of the present invention can support at a minimum the following types of interrupts:

Regular interrupt
  processor to processor directed
  processor to all GPP broadcast
  processor to any GPP broadcast
  processor to all IOP broadcast
  processor to any IOP broadcast
NMI (Non Maskable Interrupt)
  processor to processor directed
  processor to all GPP broadcast
  processor to all IOP broadcast
  processor to all GPP and IOP broadcast
Reset Interrupt
  processor to processor directed
  processor to all GPP broadcast
  processor to all IOP broadcast
  processor to all GPP and IOP broadcast
Start processor interrupt
  processor to processor directed The above resource to resource signalling could be used to indicate the occurrence of events such as:
  An I/O process completing a requested transfer.
  A processing queue becoming empty.
  A process queue being started which requires processor service.
  The need to start a specific I/O process.
  Signalling a unique processor of a high priority request.
  The occurrence of a catastrophic event.
  A restart of a hung processor.
  A restart of the system.

Interrupt commands are part of the regular command set used on the bus. The issuer of an interrupt command first arbitrates for the address/command bus in the same way as any other command issuer using the bus. In the preferred embodiment of the present invention, the interrupt request command uses the address/command bus for 2 clock cycles.

When an interrupt command is issued on the address/command bus, it contains the following information:

Source ID-the module which issued the interrupt. Note that the particular slot which contains the module is known from the last arbitration sequence.
  Destination ID-with a directed type interrupt, this is the particular slot and module whom the issuer wants to have handle the interrupt.
  Interrupt vector-the vector to the location in memory which contains the interrupt code to be executed by the resource handling the interrupt. In the preferred embodiment of the present invention, this ranges from 0 to 255.
  Interrupt priority-the priority level of the interrupt task. In the preferred embodiment, this ranges from 0 to 255.
  Interrupt type-indicates whether the interrupt is directed, broadcast, limited to a class, standard, NMI, Reset, or Start.
  Interrupt pointer-a presently undefined field in the preferred embodiment of the present invention but which could be used in a variety of ways according to the desires of a particular system and configuration.

Standard interrupt tasks (as opposed to NMI, Reset, or Start type interrupts) are accepted for handling based on the priority of the interrupt task being higher than the priority of the task currently running on the processor which will be handling the interrupt task. As with other command operations, an acknowledgement from the interrupt handling processor is required to indicate to the requesting processor that the task will be handled. If the interrupt is of the broadcast type, an additional response known as the Interrupt Processor Acknowledge (IPA) is sent by the processor which will be handling the requested interrupt task. This acknowledgement sequence is discussed in more detail below.

Figure 19:
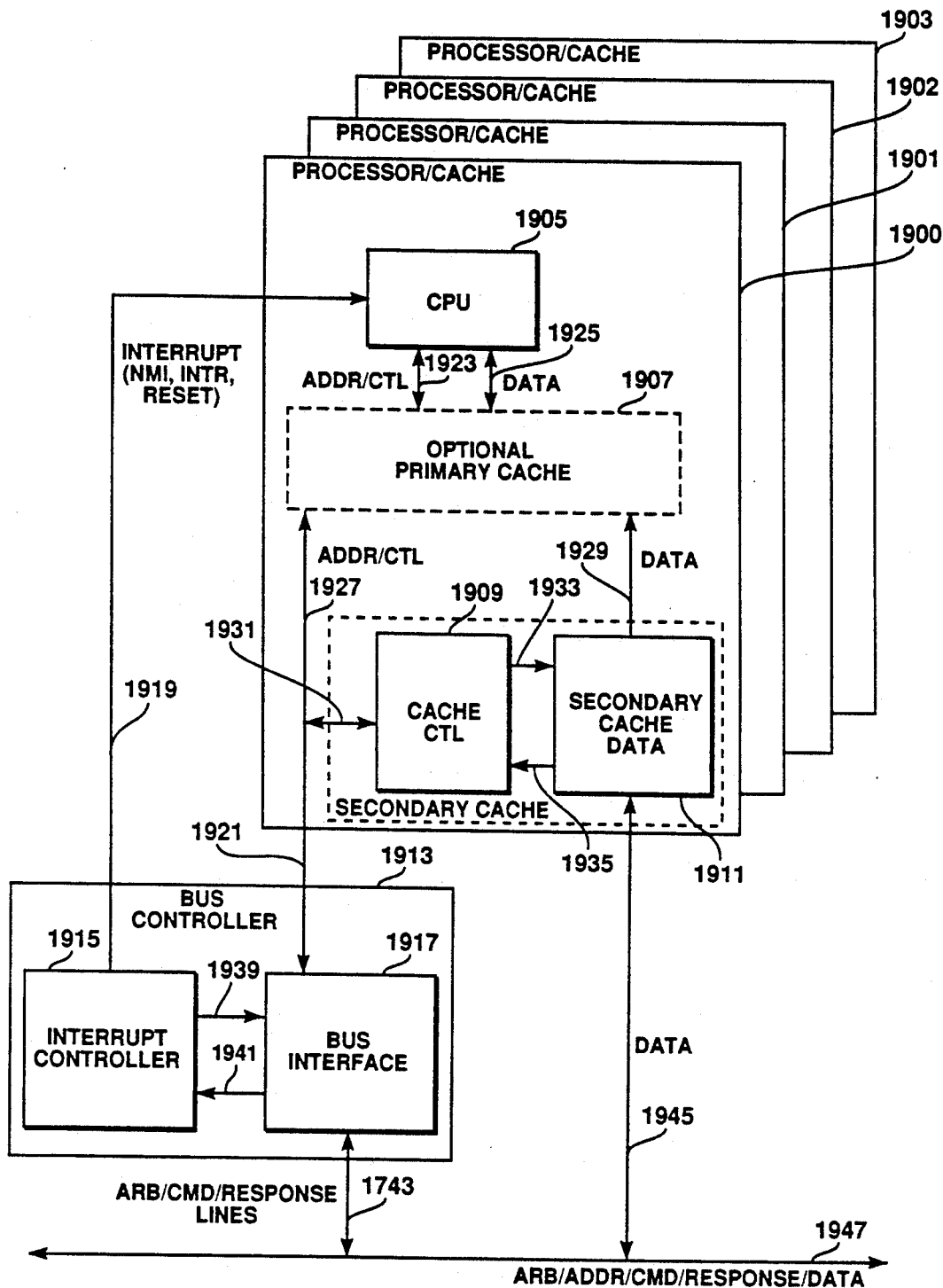
FIG. 19 depicts a processor card (containing up to four processor/cache modules) with its associated bus controller and the bus interface.

Referring now to FIG. 19, a single slot configuration is shown connected to bus 1947 which is comprised of the arbitration bus, the address/command bus, the data bus, and the various response signals. This single slot holds a card which contains a Bus Controller 1913, and up to four Processor/Cache modules 1900, 1901, 1902, and 1903. The Bus Controller 1913 is comprised of an Interrupt Controller 1915 and a Bus Interface 1917. Each Processor module 1900, 1901, 1902, and 1903, is comprised of a CPU 1905, an optional primary cache 1907, and a secondary cache 1937.

It is the function of the Bus Controller 1913, through the Bus Interface 1917, to handle the interaction between the card in the slot (with its respective processors) and the arbitration bus, address/command bus, and the response signal lines, as represented by the signal line 1947. In this way, in the preferred embodiment of the present invention, whenever Processor 1900 (or Processor 1901, 1902, or 1903) wishes to issue a command on the address/command bus (after arbitrating for access via the arbitration bus) it is the bus interface 1917 which actually sends and receives the arbitration signals and commands.

It is also the function of the Bus Interface 1917 to monitor the traffic on the address/command bus in order to inform the Processors 1900, 1901, 1902, and 1903 if there is an issued command directed to them. Through this monitoring function, any received interrupt command is sent from the Bus Interface 1917 to the Interrupt Controller 1915 because it is the function of the Interrupt Controller 1915 to handle both incoming and outgoing interrupt commands.

In the preferred embodiment of the present invention, when Processor 1900 wishes to issue an interrupt request, Processor 1900 begins by loading a set of send interrupt registers contained in the Bus Controller 1913 with the information necessary to have an interrupt command issued and have the requested interrupt task handled.

The send interrupt registers, 8 bits each in the preferred embodiment of the present invention, are as follows:

SND_LEV-the priority of the interrupt task being requested.

SD_VECT-the vector to the location in memory containing the interrupt task code to be executed.

SD_TYPE-the type of the interrupt being requested.

USR_LEV-the highest priority user task lever possible in the system.

DEST-the destination processor module of the interrupt task request. Note that this includes both a 4 bit slot ID and a 2 bit module ID (which leaves 2 unused bits).

SD_PTR(3:0)-4 separate registers which in combination comprise a 32 bit pointer to be used in whatever fashion the system desires.

Next, Processor 1900 writes to an 8 bit Send Control Register (SCR) to set a LIMIT field (2 bits) to the number of times to attempt sending the interrupt request until an acknowledgement is received. The Processor 1900 also sets a SEND bit in the SCR which tells the Bus Controller 1913 to begin the process of issuing the interrupt command.

Upon seeing the SEND bit set, the first thing the Bus Controller 1913 does is write to a Status Register (8 bits). The Status Register includes a SENT bit which tells when an acknowledgement is received, three COUNT bits which tell how many times the interrupt command has been sent, and a PEND bit which tells whether or not an interrupt command is even in the process of being issued. Thus, when the Bus Controller 1913 sees the SEND bit set in the SCR by the Processor 1900, the Bus Controller 1913 resets both the SENT bit and the COUNT bits, and sets the PEND bit.

Next, the Bus Interface 1917 of the Bus Controller 1913 arbitrates for access to the address/command bus by sending an arbitration signal on the arbitration bus. Then, when the Bus Interface 1917 gains access to the address/command bus, the Bus Interface 1917 issues an Interrupt Processor Request (IPR) command.

In the preferred embodiment of the present invention, the IPR command includes such information (gathered from the send registers) as the priority of the requested interrupt task (8 bits), the type of the interrupt (8 bits), the destination ID (6 bits), the source module ID (2 bits), the interrupt vector (8 bits), and in the next clock cycle on the address/command bus, the interrupt pointer (32 bits). Note that the source slot is not included in the IPR command because it is already known from the arbitration cycle which resulted in the issuance of the IPR command (in the preferred embodiment of the present invention the winner of that arbitration cycle is retained until the next arbitration winner is resolved).

After the IPR command is issued, if no achknowledgement is received, the IPR command is sent again. Resending the IPR command, known as a retry, uses a three-tiered scheme in the preferred embodiment of the present invention. Retry is necessary when either i) a Command or Address Negative Acknowledge (CAN) signal is received following a directed type interrupt (indicating that the specifically requested processor was unable to the handle the requested interrupt for some reason); or, ii) no Interrupt Processor Acknowledge (IPA) command is received following a broadcast type interrupt (indicating that none of the class of resources sent the broadcast interrupt acknowledged their ability to handle the interrupt request for one of a variety of reasons, e.g., the interrupt task priority level was insufficient to interrupt any of the processors/resources in the class).

The three-tiered IPR retry scheme, as referred to above, is used if no acknowledgement is received in response to an IPR command (when CAN is received instead of either a Selected (SLD) response, if the interrupt was of the directed type, or an IPA, if the interrupt was of the broadcast type). The IPR retry scheme works by initially sending the IPR command for the number of times specified in the LIMIT field of the SCR. This is the first tier and is designed to interrupt any idle processor and make it active. Then, if no acknowledgement is received in the first tier, the priority of the requested interrupt task is increased to that of the highest possible user task level. This is the second tier and is designed to interrupt a processor executing a standard user task. If no acknowledgement is received in the second tier, then the priority of the interrupt task is increased again, but this time to that of a system of supervisory task. This is the third and last tier and as such is designed to ensure that the requested interrupt task gets handled.

The Bus Interface 1917 does not set the SENT bit in the Status Register until the interrupt is considered delivered (when the Bus Interface 1917 sees the SLD signal in response to a directed interrupt or both the SLD signal and an IPA command in response to a broadcast interrupt). Therefore, the Processor 1900 can monitor the progress and delivery of an interrupt by merely polling the SENT bit in the Status Register.

After checking the status of the pending interrupt request, assuming it is not yet acknowledged, the Processor 1900 can alter further attempts at issuing the interrupt request. For instance, if the Processor 1900 wants to ensure that the interrupt request gets handled more quickly than the three-tiered scheme might allow, the Processor 1900 can immediately change the priority of the requested interrupt task and again set the SEND bit in the SCR thus forcing the Bus Controller 1913 to begin sending the IPR command again but at a higher priority level this time. Alternatively, the Processor 1900 can abort the requested interrupt and prevent any further attempts to send the interrupt by merely resetting the SEND bit in the SCR register.

Figure 16:
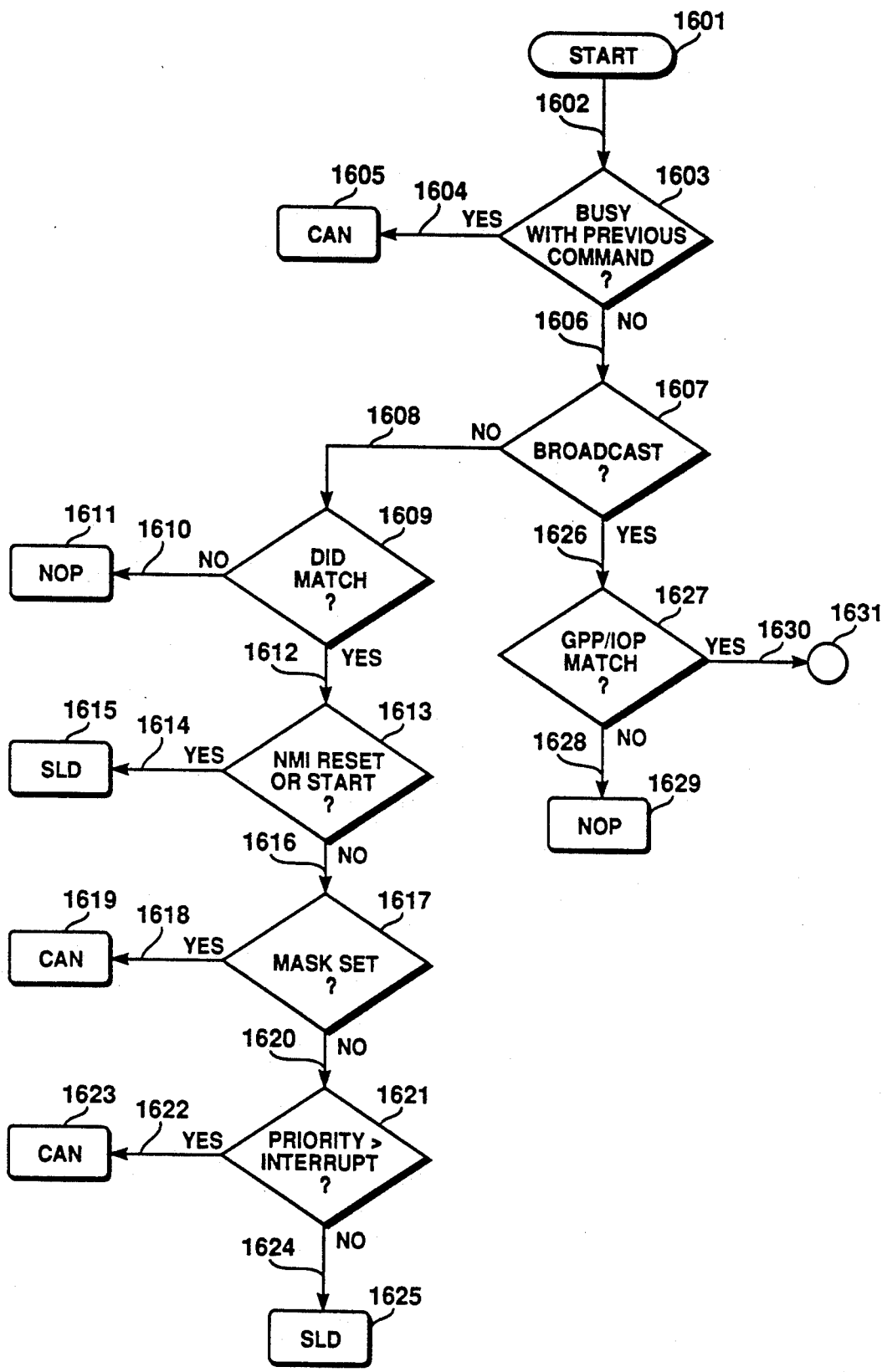
FIG. 16 is a flowchart of the steps taken when receiving an Interrupt Processor Request Command.

Referring now to FIG. 16, the process of receiving an IPR command is reviewed. Beginning with decision box 1603, if the Bus Controller 1913, the Cache 1937, or the Processor 1900 is busy when an IPR command comes across the address/command bus 1947, the Bus Interface 1917 asserts the CAN response signal line (process 1605) to indicate inability to handle a command at that time. Alternatively, if the slot is not busy with a previous command, following processing path 1606, the IPR command is decoded and the information is placed in receive registers, 8 bits each in the preferred embodiment, as follows:

RCV_LEV-the priority level of an incoming interrupt.
RC_VECT-the priority of a currently pending interrupt.
RC_TYPE-interrupt type.
SOURCE-the processor which issued the interrupt.
RC_PTR (3:0)-4 separate registers which in combination comprise a 32 bit pointer to be used in whatever fashion the system desires.

Referring again to FIG. 16, and following processing path 1606, if the interrupt is not of a broadcast type (decision block 1607) then the Destination ID is checked to see whether this receiving slot and module matches the requested destination (decision block 1609). If not, then this slot and modules/agents/resources/processors need not respond and a No Operation (NOP) can be issued. Conversely, if there is a match, following processing path 1612, then the interrupt type is checked (decision block 1613) to see whether this interrupt task request is of the NMI, Reset or Start type (as opposed to a standard type interrupt). If it is, then the requested slot and module will issue an SLD signal line response to acknowledge the interrupt request. If not, following processing path 1616, then the mask bit is checked to see if the requested module is currently blocking out standard type interrupts. If the requested module's mask bit is set, then a CAN response signal is sent (process step 1619), whereas if it is not, then the priority of the interrupt task is then compared to the priority of the task currently executing on the requested module. If the currently executing task is of an equal or higher priority than the requested interrupt task, then the currently executing task will not be interrupted and the CAN response signal is asserted (process step 1623). Otherwise, because the interrupt task is of a higher priority than the currently executing task, the SLD response line is asserted (process block 1625) indicating acknowledgement of the requested interrupt task by the requested slot and module.

If it was determined (in decision block 1607) that the interrupt was of a broadcast type, following processing path 1626, then it must next be determined whether this slot and module is a member of the class (GPP, IOP, etc.) for which the interrupt is intended. If this slot and module is not of the intended GPP or IOP type, then a NOP command would be issued. However, if there is a match of class type, following processing path 1630, the process continues via continuation block 1631.

Figure 17:
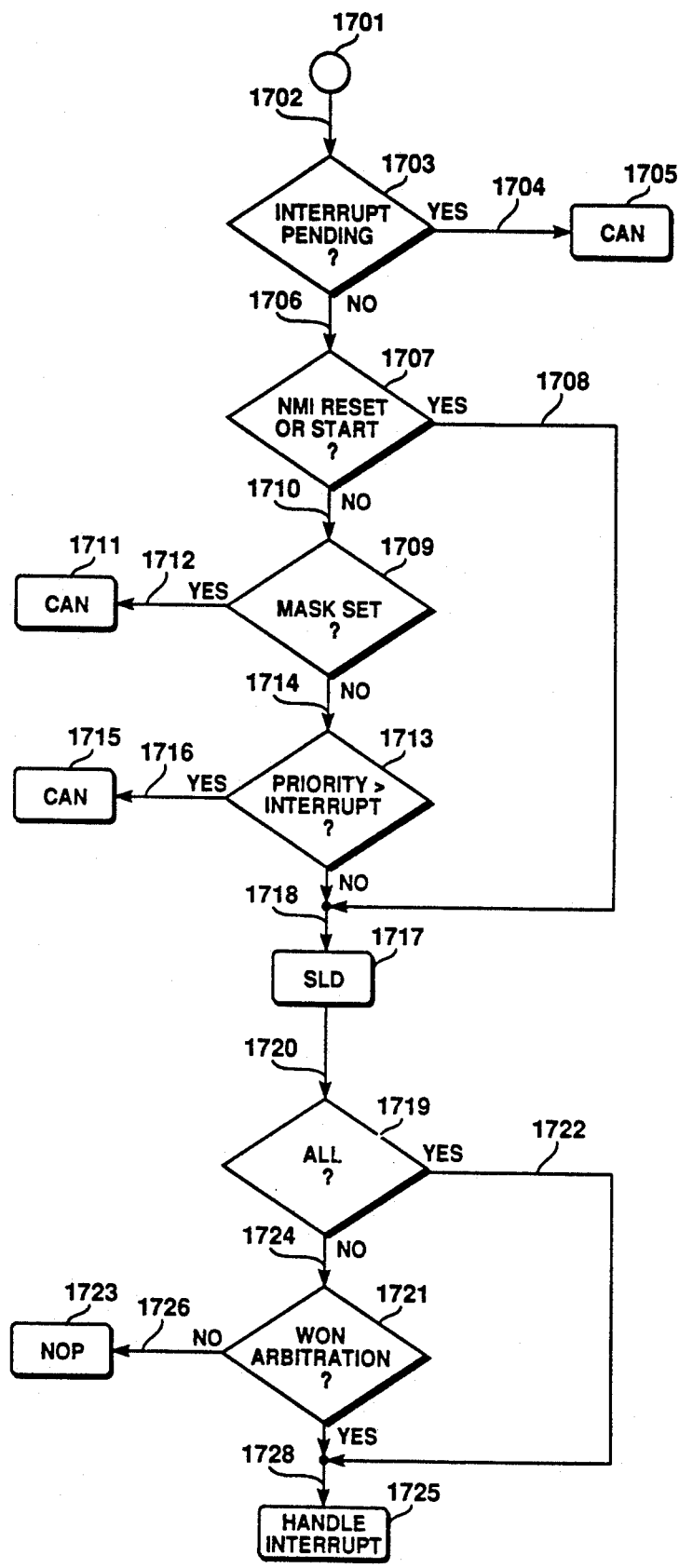
FIG. 17 is a further flowchart of the steps taken when receiving an Interrupt Processor Request Command.
Figure 18:
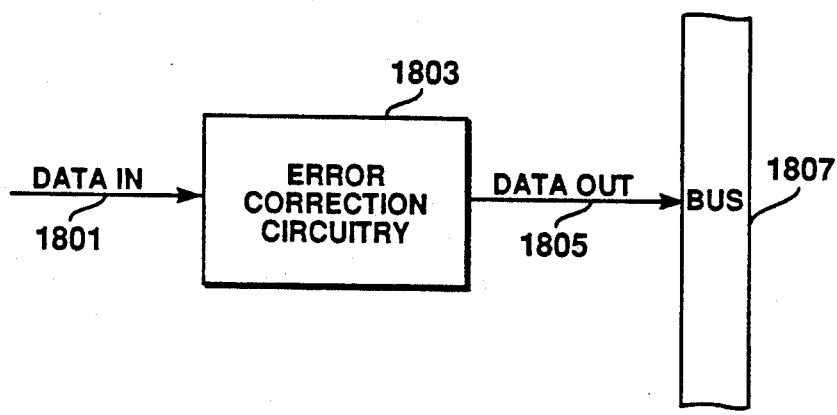
FIG. 18 depicts the correct only mode of the ECC circuitry of the prior art.

Referring now to FIG. 17 and beginning with continuation block 1701 (equivalent to continuation block 1631 of FIG. 16) wherein a match has been found between the requested class of resource module and the receiving resource module, following processing path 1702, it must now be determined whether the receiving resource already has an interrupt pending (decision block 1703). If there is an already pending interrupt for this module then a CAN signal is sent (process step 1705) indicating inability to handle another interrupt at this time. Otherwise, following processing path 1706, the type of the broadcast interrupt must next be checked (decision block 1707).

If this broadcast interrupt is not of an NMI, Reset, or Start type, (decision block 1707) then the receiving module must be checked to see whether its mask bit is set (decision block 1709) thus blocking out any standard interrupts for a period of time. If the mask bit is set, then the CAN signal line would be asserted (processing block 1711). However, if the mask bit is not set, following processing path 1714, the priority of the broadcast interrupt is compared to the priority of the currently executing task in the respective module (decision block 1713). If the priority of the currently executing task is greater than or equal to the requested interrupt task, then the currently executing task will not be interrupted and a CAN signal will be sent (process step 1715). However, if the priority of the requested interrupt task is greater than the currently executing task then, following processing path 1718, the SLD signal will be asserted to acknowledge the IPR command. Note that it is at processing path 1718 that the positive outcome of the decision whether the interrupt was of the NMI, Reset, or Start type (decision block 1707) comes back in to the process via processing path 1708.

After the SLD signal has been asserted, the interrupt type must again be queried, but this time as to whether it is requesting that all or merely any one of the processor modules of the class are desired (decision block 1719). If any single processor module is desired, then all the processors of that class (which have each gone through the process flow of FIGS. 16 and 17) must arbitrate to determine which one will handle the requested interrupt. After arbitration (decision block 1721), the winning processor module will issue an IPA command indicating that it will be the one handling the requested interrupt and following processing path 1728, will handle the requested interrupt (process step 1725). All other processors of the class which did not win the arbitration, upon seeing the issued IPA command from the winning processor will issue a NOP command (process step 1723) or merely drop out of contention for handling the interrupt.

Conversely, referring back to decision block 1719, if the broadcast interrupt type is intended for all members of the class, then each one of the processors in the group (following processing path 1722 to processing path 1728) will handle the requested interrupt in process step 1725.

Handling the requested interrupt (process step 1725) requires several preliminary steps. The first step is to mask out any further interrupts by setting the mask bit of the respective processor. This is done by the Interrupt Controller 1915. Next the interrupt vector is sent to the Processor 1900 so as to begin actually handling the requested interrupt. Next, the currently executing program, along with its processing priority, must be saved and the processing priority of Processor 1900 must be set to that of the interrupt being handled. Lastly, Processor 1900 in preparation to execute the requested interrupt code resets its own mask bit, thus making itself available for interruption by a higher priority interrupt request.

When Processor 1900 has finished handling the requested interrupt task, the prior executing task which was earlier saved is brought back into Processor 1900 to continue executing and the processing priority of Processor 1900 is returned to the processing priority of that prior task.

Caching is required to extract the maximum performance from multiple processors on the bus. The bus bandwidth requirement per processor is minimized by the choice of cache characteristics and the caching protocol. Optimizing the bus architecture to address the characteristics of the entire range of possible applications is always a trade-off. However, this bus provides a solution for a wide range of computational needs.

Cache characteristics of primary importance are write-back ability, cache size, line size and degree of associativity. The bus protocol is optimized for the characteristics of a write-back cache. It is assumed that write-through or non-caching bus traffic will be eliminated where possible, however, this is not mandated by the bus. Most of these optimizations are dependent on the way software uses the hardware features, i.e., the assignment of pages for write-through caching and use of lock operations.

In the preferred embodiment, the cache line size on the bus is 64 bytes. This choice is a tradeoff between miss ratio, latency and bus bandwidth utilization. Other cache attributes such as size and degree of associativity may be implemented in any manner and are not dictated by the bus.

The memory address space supported on the bus is 32 Gbytes, which is derived from a combination of 32 address bits and 8 byte lane controls. In addition to memory space, the bus also defines a 32 Gbyte I/O space. The upper megabyte of I/O space on the bus is used for system configuration and bootstrap.

Each request placed on the bus is for either a cache line of data, or a portion of a bus word. Requests from the CPU for other data lengths (greater than a bus word yet less than a full cache line) are normally handled as cache line transfers, or if not cached must be sent on the bus as multiple bus word operations.

The bus permits memory or I/O space to be windowed by hardware or firmware into other bus environments via IOPs and handled as out-of-order split transfers. This provides ease of portability of drivers written for other environments (i.e., Multibus I, MPI interface on Multibus II, etc.).

All other types of CPU cycles (i.e., non-compute cycles such as interrupt acknowledge operations rather than memory read or writes or I/O read or writes or interrupt commands themselves) need to be handled by on board logic.

The bus uses separate Address/Command and Data buses to achieve high bandwidth. The Address/Command bus provides the address and command code for each bus transfer. Additionally, the Address/Command bus provides the mechanism for interrupts on the bus.

The 64 bit Data bus requires 9 clocks for each 64 byte cache line transfer (the primary operation on the bus); 8 to transmit the data and 1 for a clean bus exchange between transfers. To prevent the Data bus becoming a performance limitation, in an alternative embodiment the Data bus bandwidth could be expanded by adding a second 64 bit data path to operate in parallel with the first 64 bit data path. The Address/Command bus would then provide requests to both of the parallel Data buses, and has sufficient bandwidth to simultaneously keep both data paths running at full bandwidth.

Figure 15:
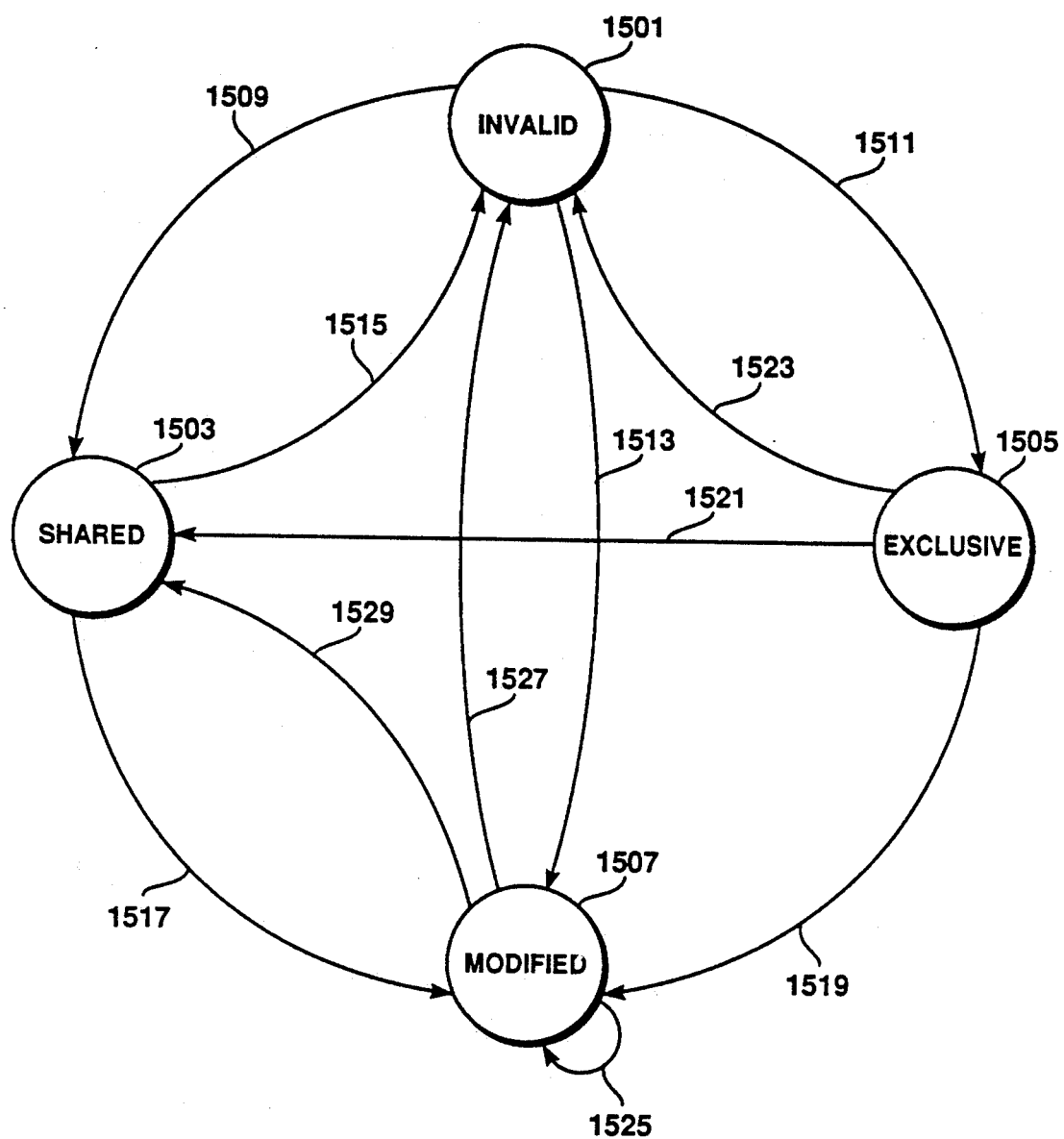
FIG. 15 depicts a cache coherency state diagram.

The state diagram of FIG. 15 shows the transitions which occur to each cache line in each cache using a combination Write-Through/Write-Back (SI/MESI) Cache-Coherency Protocol.

Beginning with the Invalid state 1501, where each cache line starts, there are essentially two options once it is decided that a particular cache line is going to be used (for instance, on a read miss where that particular cache line is allocated for the incoming data). If the cache owner (which includes the cache controller, the processor which owns that cache, and the bus interface on the card which contains the cache and processor) has no current plans to modify the data coming in to that cache line, then a Read Shared Line (RSL) command will be issued to read the data in to the cache line. If another cache owner, upon seeing the RSL command, has the same data in its cache, the other cache owner will issue a Cached Data Shared (cds) signal. The cache owner which issued the RSL command will then transition this cache line of data to the Shared state 1503 via state transition 1509.

Conversely, if the cache owner receives no response to the RSL command from another cache (i.e., no cds signal is received) then the cache owner, upon receiving the data for that cache line, has a choice. The cache owner can either transition the cache line to the Shared state 1503 (as was done above) if a write-through cache protocol is being used, or instead, the cache owner can transition the cache line to the Exclusive state 1505 via state transition 1511 if a write-back cache protocol is being used. Even though there may be no current plans to modify the data, the advantage of transitioning the cache line to the Exclusive state 1505 when using a write-back protocol is that it allows the cache owner to later modify the data (and transition to the Modified state 1507) without requiring a bus transaction to invalidate any other cache owner's cache line. The reason no other cache owner's cache line needs to be invalidated is because no one else is sharing this data with the cache owner (if they were, they would have responded to the RSL command by asserting the cds signal). To repeat, even though the cache owner had no plans to modify the data when the RSL command was issued, by transitioning the cache line to the Exclusive state 1505 when there was no cds signal received in response to the RSL command, the cache owner is free to later decide to modify the data without concern about invalidating another cache owner's cache line.

Alternatively, if the cache owner holding a cache line in the Invalid state 1501 needs to allocate that cache line in order to make room for incoming data which the cache owner plans to modify, the cache owner will issue a Read and Invalidate Line (RIL) command. Issuing an RIL command is simpler for the cache owner because there is no concern about whether the data coming in to that cache line is currently held in a Shared state 1503 and as such the cache owner doesn't have to watch for a cds response signal. Instead, the cache owner merely issues the RIL command, places the data in the cache line when the data is received, and then transitions the cache line to the Modified state 1507 via state transition 1513.

Note that an equivalent transition would be to first transition the cache line to the Exclusive state 1505 via state transition 1511 and then, when the data is actually modified, to transition the cache line to the Modified state 1507 via state transition 1519. However, because the data is being read in to the cache line with the present invention to modify it (hence using the RIL command), the cache line would only stay in the Exclusive state 1505 for a short time and as such it is equally valid to transition the cache line directly from the Invalid state 1501 to the Modified state 1507 via state transition 1513.

Once the cache line is in the Shared state 1503, there are several conditions that will cause the cache line to transition out to another state. For instance, if the cache line is needed to make room for other data, then the cache line may be allocated for that incoming data thus causing that cache line to transition to the Invalid state 1501 via state transition 1515. Similarly, if the whole cache is flushed, then likewise, that cache line will transition to the Invalid state 1501 via state transition 1515.

If the cache owner sees an RSL command re the data in a cache line held in the Shared state 1503, indicating that another cache owner wishes to read that data with no present intention of modifying it, then this cache owner should issue a cds signal to notify the other cache owner that the data is presently held in a Shared state 1503. This is particularly important when using a Write-Back (MESI) protocol because the other cache owner who issued the RSL command, without receiving a cds signal, would transition their cache line from an Invalid state 1501 to an Exclusive state 1505 (instead of to the Shared state 1503) thus violating the shared status of the cache line in this owner's cache.

If the cache owner sees an RSL command re the data in a cache line held in the Shared state 1503, indicating that the cache line is being read into another cache owner's cache line with the present intent to modify it, this cache owner should transition the cache line to the Invalid state 1501 via state transition 1515, since this cache owner will very soon be holding stale data (with no further indication of when that data will actually be modified).

If the cache owner needs to modify the data in a cache line held in the Shared state 1503, the cache owner would first issue an Invalidate Cache Line (ICL) command re that cache line and then transition that cache line from the Shared state 1503 to the Modified state 1507 via state transition 1517.

Conversely, if the cache owner sees an ICL command re data in a cache line held in the Shared state 1503, indicating that the cache line is being modified by another cache owner sharing that cache line, because this means that this cache owner now has stale data in this cache line, this cache owner should transition this cache line to the Invalid state 1501 via state transition 1515.

If a cache owner holding data in a cache line held in the Exclusive state 1505 wishes to modify the data in that cache line, the cache owner would merely transition that cache line to the Modified State 1507 via state transition 1519. This is because the cache owner originally transitioned that cache line to the Exclusive state 1505 in order to be able to modify that cache line at will, with no other steps needing to be taken by the cache owner.

If the cache owner holding data in a cache line held in the Exclusive state 1505 sees an RSL command re that data, indicating another cache owner's desire to read the data held in this cache owner's cache but with no intention of modifying it, would require this cache owner to issue a cds signal to indicate to the other cache owner that this cache owner wishes to share that data. This cache owner would then transition this cache line to the Shared state 1503 via state transition 1521.

If the cache owner holding data in a cache line in the Exclusive state 1505 sees an RIL command re that data, indicating another cache owner's desire to read in to their cache, and modify, the data already held in an Exclusive state 1505 by this cache owner, would require this cache owner to transition this cache line to the Invalid state 1501 via state transition 1523. This is because the other cache owner will be modifying this cache line of data with no further indication of when it actually occurs and this cache owner would then be holding stale data if it were to try and maintain this cache line in an Exclusive state 1505.

Unlike a Write-Through (IS) cache coherency protocol which requires the cache owner to write data back to memory immediately after a cache line is modified, with a Write-Back (MESI) cache coherency protocol when the cache owner modifies data held in a cache line (regardless of which state the cache line was in when the data was modified), the cache line merely transitions to the Modified state 1507. Also, whenever the data is further modified, the cache line merely transitions back to the Modified state 1507 via state transition 1525. Thus, as compared to a Write-Through (IS) cache coherency protocol, a Write-Back (MESI) cache coherency protocol has the advantage of avoiding bus transactions to write modified data back to memory every time a cache line is modified.

If a cache line held in a Modified state 1507 is needed to make room for other data, then the cache line may be allocated for that incoming data thus causing that cache line to transition to the Invalid state 1501 via state transition 1527. Similarly, if the whole cache is flushed, then likewise, a cache line held in a Modified state 1507 will transition to the Invalid state 1501 via state transition 1527. However, unlike when a cache line is held in a Shared state 1501 or an Exclusive state 1505, the cache owner holding a cache line in the Modified state 1507 has the most up-to-date copy of the data because the cache line, by residing in the Modified state 1507, has been modified. Therefore, if the cache owner holding a cache line in the Modified state 1507 did not update memory (or at have a copy of it saved) when it invalidates that cache line, the changes made to the data by that cache owner would be lost. Therefore, when the cache owner allocates a cache line held in the Modified state 1507 or when the cache owner flushes the cache which has a cache line held in the Modified state 1507, in the preferred embodiment of the present invention, the cache owner would issue a Write Cache Line (WCL) command to thus write the modified data back to memory. The WCL command thus provides memory with the most up-to-date copy of the data.

If a cache owner, holding a cache line in the Modified state 1507 sees an RSL command re the data in that cache line, indicating another cache owner's desire to read that data with no intention of modifying it, this cache owner would do several things. This cache owner would issue a cds signal to notify the cache owner who issued the RSL command that the requested data will be held in a Shared state 1503 by this cache owner. This cache owner would also issue a Cached Data Modified (cdm) signal to tell memory not to provide the requested data to the cache owner which issued the RSL command. This is because memory has, by definition, a stale copy of the data. This cache owner would also provide the requested data to the other cache owner which issued the RSL command. These steps are known as an Intervention operation wherein the cache owner holding the cache line in a Modified state (which by definition means that that cache owner has the most up-to-date copy of the data) has the responsibility of intervening whenever another cache owner requests that modified data. Lastly, this cache owner would transition this cache line to the Shared state 1503 via state transition 1529 so that both this cache owner and the cache owner which issued the RSL command can legitimately share the data held in their respective cache lines.

If a cache owner holding a cache line in a Modified state 1507 sees an RIL command re the data in that cache line, indicating another cache's desire to read the data with the intention of modifying it, this cache owner would do several things. This cache owner would issue a cdm signal to tell memory not to provide the requested data to the cache owner which issued the RIL command. This is because memory has a stale copy of the data. This cache owner would also provide the requested data to the other cache owner which issued the RIL command. As stated above, these steps are known as an intervention operation. Lastly, this cache owner would transition this cache line to the Invalid state 1501 via state transition 1527 because the other cache owner will be modifying the data without any further indication of when this will actually happen.

As stated above, whenever another cache owner issues an RSL or an RIL command re data held in a Modified state 1507 by this cache owner, forces this cache owner to do an intervention operation. Of course, at some point memory itself will need to be updated with the modified data. This is accomplished by having memory, whenever it sees a cdm signal, do a "snarf" operation on (aka input, grab a copy of) the modified data as it is being transmitted from the intervening cache owner to the cache owner which issued the RSL or RIL command. In this way, memory maintains a reasonably up-to-date copy of the data and there is no additional overhead to update memory. Note that the snarfed data may not be completely up to date in the cache of an intervention operation in response to an RIL command because the cache owner which issued the RIL command will be further modifying the snarfed data and the memory won't get a copy of that further modified data until that cache owner writes it to memory on a cache line allocate or cache flush or until some other cache owner issues an RIL or RSL command re that data and that cache owner does an intervention operation.

Referring now to FIG. 19, various potential transactions dealing with the cache 1937 will be reviewed. If Processor 1900 attempts a read operation of cache data 1911, in the preferred embodiment of the present invention, Processor 1900 would request Cache Controller 1909 to provide the data. If Cache Controller 1909 determines that the requested data is not in Cache Data 1911, Cache Controller 1909 would allocate a cache line in Cache Data 1911. If the cache line was already in the Invalid state, the Cache Controller would signal Bus Interface 1917 within Bus Controller 1913 to issue a Read Shared Line (RSL) command. Note that if the cache line was not in the Invalid state, it could be treated differently, as is discussed below. The Bus Interface 1917 would arbitrate for bus access and then issue the RSL command on the address/command bus 1947.

When the requested data returns on the Data Bus 1947, it is placed in the allocated cache line in Cache Data 1911. The Bus Interface 1917, in the meantime, has been watching the response signal lines 1947 for a cds response signal 1947. If the Bus Interface 1917 saw a cds signal 1947 in response to the RSL command, the Bus Interface 1917 would have signalled the Cache Controller 1909 to tag the allocated cache line as Shared. Conversely, if the Bus Interface 1917 had not seen a cds signal 1947 in response to the RSL command, the Bus Interface 1917 would not have signalled the Cache Controller 1909 and therefore the Cache Controller 1909 would have tagged the allocated cache line as Exclusive. In the preferred embodiment of the present invention the cds signal 1947 would have been asserted, if at all, 2 clock cycles after the RSL command.

If Processor 1900 attempts a read operation of some data, with the intent to write to that data, in the preferred embodiment of the present invention, Processor 1900 would request Cache Controller 1909 to provide that data. If Cache Controller 1909 determines that the requested data is not in Cache Data 1911, Cache Controller 1909 would allocate a cache line in Cache Data 1911. If the cache line is already in the Invalid state, Cache Controller 1909 would signal Bus Interface 1917 within Bus Controller 1913 to issue a Read and Invalidate Line (RIL) command. Bus Interface 1917 would arbitrate for bus access and then issue the RIL command on the address/command bus 1947. When the requested data returns on the Data Bus 1947, it is fed into the allocated cache line in Cache Data 1911. The Cache Controller 1909 would have tagged the allocated cache line Modified.

If Processor 1900 attempts a read operation of some data, in the preferred embodiment of the present invention Processor 1900 would request Cache Controller 1909 to provide the data. If Cache Controller 1909 determines that the requested data is not in Cache Data 1911, Cache Controller 1909 would allocate a cache line in Cache Data 1911. If the cache line is in the Shared state, Cache Controller 1909 would tag it Invalid and signal Bus Interface 1917 within Bus Controller 1913 to issue a Read Shared Line (RSL) command. Bus Interface 1917 would arbitrate for bus access and then issue the RSL command on the address/command bus 1947. When the requested data returns on the Data Bus 1947, it is placed in the allocated cache line in Cache Data 1911. The Cache Controller 1909 would have tagged the allocated cache line either Shared or Exclusive depending, as discussed above, upon whether the Bus Interface 1917 saw a cds signal 1947 in response to the RSL command.

If Processor 1900 is being removed or turned off, Processor 1900 would warn Cache Controller 1909. Cache Controller 1909 would flush Cache Data 1911 and, with respect to those cache lines held in a Shared state, would tag those lines invalid.

If Processor 1900 wishes to write to data in a cache line in Cache Data 1911, Processor 1900 would signal Cache Controller 1909 to make the requested modifications. If that cache line of data in Cache Data 1911 is being held in a Shared state, Cache Controller 1909 would signal Bus Interface 1917 to issue an Invalidate Cache Line (ICL) command to warn the other caches, which were holding that same data in one of their cache lines in the Shared state, to tag those cache lines Invalid. This Cache Controller 1909, after signalling Bus Interface 1917, would tag the cache line Modified.

In the preferred embodiment of the present invention, if Bus Interface 1917 sees an RIL command come across Address/Command Bus 1947, Bus Interface 1917 would signal Cache Controller 1909 to check whether the RIL was re data held in one of it's cache lines in Cache Data 1911. If it is, and if the cache line was being held in either the Shared or Exclusive state then Cache Controller 1909 would tag that cache line Invalid.

If Bus Interface 1917 sees an RSL command come across Address/Command Bus 1947, Bus Interface 1917 would signal Cache Controller 1909 to check whether the RSL was re data held in one of its cache lines in Cache Data 1911. If it is, and if the cache line was being held in the Shared state, then Cache Controller 1909 would signal Bus Interface 1917 to assert the cds response signal line 1947 to warn the RSL issuer that the data is already being held in a Shared state.

If Bus Interface 1917 sees an RSL command come across Address/Command Bus 1947, Bus Interface 1917 would signal Cache Controller 1909 to check whether the RSL was re data held in one of it's cache lines in Cache Data 1911. If it is, and if the cache line was being held in the Exclusive state, then Cache Controller 1909 would signal Bus Interface 1917 to assert the cds response signal line 1947 to warn the RSL issuer that the data should be held in the Shared state and the Cache Controller 1909 would tag the cache line Shared.

In the preferred embodiment of the present invention, if Processor 1900 wishes to write to data in a cache line in Cache Data 1911, Processor 1900 would signal Cache Controller 1909 to make the requested modifications. If that cache line of data in Cache Data 1911 is being held in an Exclusive state, Cache Controller 1909 would tag the cache line Modified.

If Processor 1900 attempts a read operation of some data, Processor 1900 would request Cache Controller 1909 to provide the data. If Cache Controller 1909 determines that the requested data is not in Cache Data 1911, Cache Controller 1909 would allocate a cache line in Cache Data 1911. If the cache line is in the Modified state, Cache Controller 1909 would signal Bus Interface 1917 within Bus Controller 1913 to issue a Write Cache Line (WCL) command. The WCL command writes the modified data, held in the cache line in the Modified state, back to memory. Bus Interface 1917 would arbitrate for bus access and then issue the WCL command on the address/command bus 1947. Cache Controller 1909 would also tag that cache line Invalid.

If Processor 1900 is being removed or turned off, Processor 1900 would warn Cache Controller 1909. Cache Controller 1909 would flush Cache Data 1911 and, with respect to those cache lines held in a Modified state, Cache Controller 1909 would signal Bus Interface 1917 within Bus Controller 1913 to issue Write Cache Line (WCL) command for those cache lines. Bus Interface 1917 would arbitrate for bus access and then issue the WCL commands on the address/command bus 1947. Cache Controller 1909 would also tag all cache lines Invalid with a flush operation.

In the preferred embodiment of the present invention, if Bus Interface 1917 sees an RSL command come across Address/Command Bus 1947, Bus Interface 1917 would signal Cache Controller 1909 to check whether the RSL was re data held in one of its cache lines in Cache Data 1911. If it is, and if the cache line was being held in the Modified state, then Cache Controller 1909 would signal Bus Interface 1917 to assert the cds response line 1947 to warn the RSL issuer that the data should be held in the Shared state. Cache Controller 1909 would also signal Bus Interface 1917 to assert the cdm response signal to warn memory that this Cache Controller will be providing the data because it is this Cache Data 1911 which holds the most up-to-data version of the data. The Cache Controller 1909 would then tag the cache line Shared and Cache Controller 1909 and Bus Interface 1917 would provide the requested data to the RSL issuer.

If Bus Interface 1917 sees an RIL command come across Address/Command Bus 1947, Bus Interface 1917 would signal Cache Controller 1909 to check whether the RIL is re data held in one of it's cache lines in Cache Data 1911. If it is, and if the cache line was being held in the Modified state, then Cache Controller 1909 would signal Bus Interface 1917 to assert the cdm response line 1947 to warn memory that this Cache Controller will be providing the data because it is this Cache Data 1911 which holds the most up-to-data version of the data. Cache Controller 1909 and Bus Interface 1917 would then provide the requested data to the RSL issuer and Cache Controller 1909 would tag this cache line Invalid.

Figure 20:
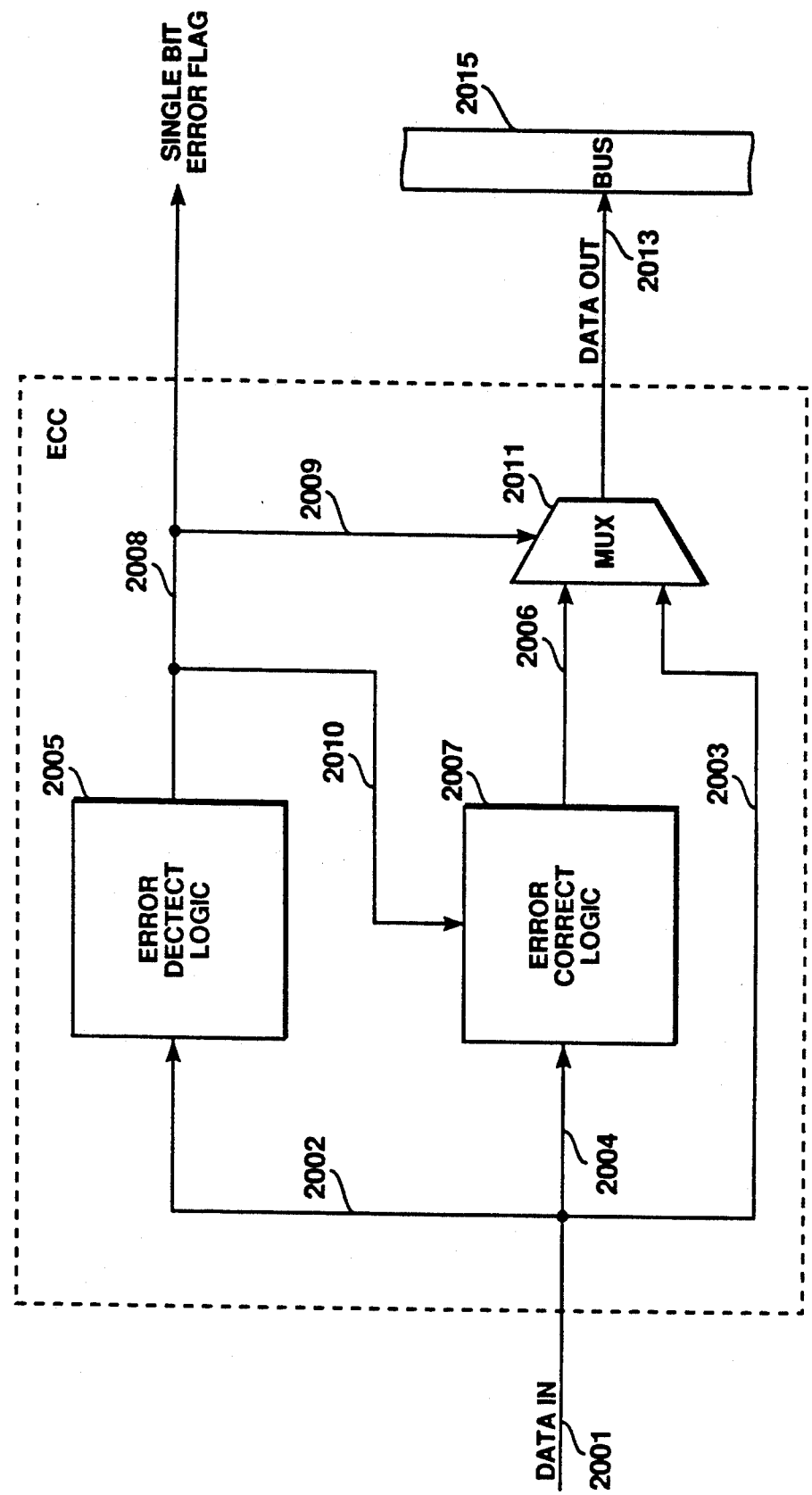
FIG. 20 depicts the detect and correct mode of the ECC circuitry.

Referring again to FIG. 20, the bus stretching protocol of the present will now be described. In the preferred embodiment of the present invention, a detect and correct ECC mode is employed, whereby the sending agent transmits data across signal line 2001. Signal line 2003 receives the data from signal line 2001 and inputs the data to output mux 2011. Output mux 2011 outputs the data on signal line 2013 to bus 2015 which carries the data to the receiving agent.

While the data is being carried on signal line 2003 to the output MUX 2011, the data is also being carried on signal line 2002 to error detection logic 2005. Error detection logic 2005 is continuously checking the data for any data errors. If error detection logic 2005 detects an error in the data being transmitted, error detection logic 2005 sends out an error flag on signal line 2008.

In the preferred embodiment of the present invention, if error detection logic 2005 detects an error in the data being transmitted, error detection logic 2005 transmits an error flag. The receiving agent receives this error flag from signal line 2008. The receiving agent, upon receiving the error flag, stops inputting the requested data for a predetermined period. This predetermined period is intended to give the sending agent, specifically the ECC circuit of the sending agent, time to attempt to correct the bad data which triggered the error flag before the receiving agent resumes inputting data.

Error correction logic 2007 continually tracks which was the last portion of data transmitted by the sending agent through the controller interface. In the preferred embodiment of the present invention, the controller interface of the sending agent contains a buffer which holds the data being transmitted by the sending agent. The buffer may be used in a flyby mode, in which case the controller interface is merely placing the data in the buffer at the same time the controller interface is transmitting the data across the bus 2015 to the receiving agent. Alternatively, the buffer may be used as a short term holding place for the data, kept until the controller interface is ready to transmit the data from the buffer across the bus 2015 to the receiving agent.

Having tracked which was the last portion of data transmitted to the receiving agent, the error correction logic 2007 knows which portion of data the error detection logic 2005 detected as being in error. Therefore, upon receiving the error flag from signal line 2010 (which is itself connected to signal line 2008), the error correction logic 2007 attempts to correct the bad data. Of course, the error correction logic 2007 will only be able to correct certain types of errors. However, the bus stretching protocol of the present invention assumes that the bad data was corrected by the error correction logic 2007, regardless of whether or not that is true in a given instance.

Note that the error flag is also transmitted to the control line 2009 of the output mux 2011 to thus switch the input to the output mux 2011 from the straight through data transmission of signal line 2003 to the corrected data from signal line 2006. In this way, (regardless of whether or not the error correction logic 2007 was actually able to correct the bad data) the error correction logic 2007 can provide the corrected bad data to the output mux 2011. Output mux 2011 will then provide the corrected bad data on signal line 2013 to the bus 2015 which will carry the corrected bad data to the receiving agent.

After the error correction logic 2007 has provided the output mux 2011 with the corrected data (again, the error correction logic 2007 may or may not actually be able to correct the bad data), then the buffer within the controller interface can begin providing to the output mux 2011 any remaining data which would have followed the bad data had the bad data not been bad. Stated differently, had the error detection logic 2005 not detected any error, then any additional data which had not yet been transmitted would, of course, have been transmitted. It is this data which is now being provided to the output mux 2011 by the buffer in the controller interface.

Additionally, the error correction logic 2007, upon receiving the error flag on signal line 2010 and attempting to correct the bad data, will update the sending agent with the corrected data in what is commonly known as a "scrubbing" operation.

Of course, the timing of when the receiving agent suspends reading data, when the controller interface of the sending agent corrects the bad data and begins sending valid data again, and when the receiving agent resumes reading data is key to the proper functioning of the bus stretching protocol of the present invention.

Figure 21:
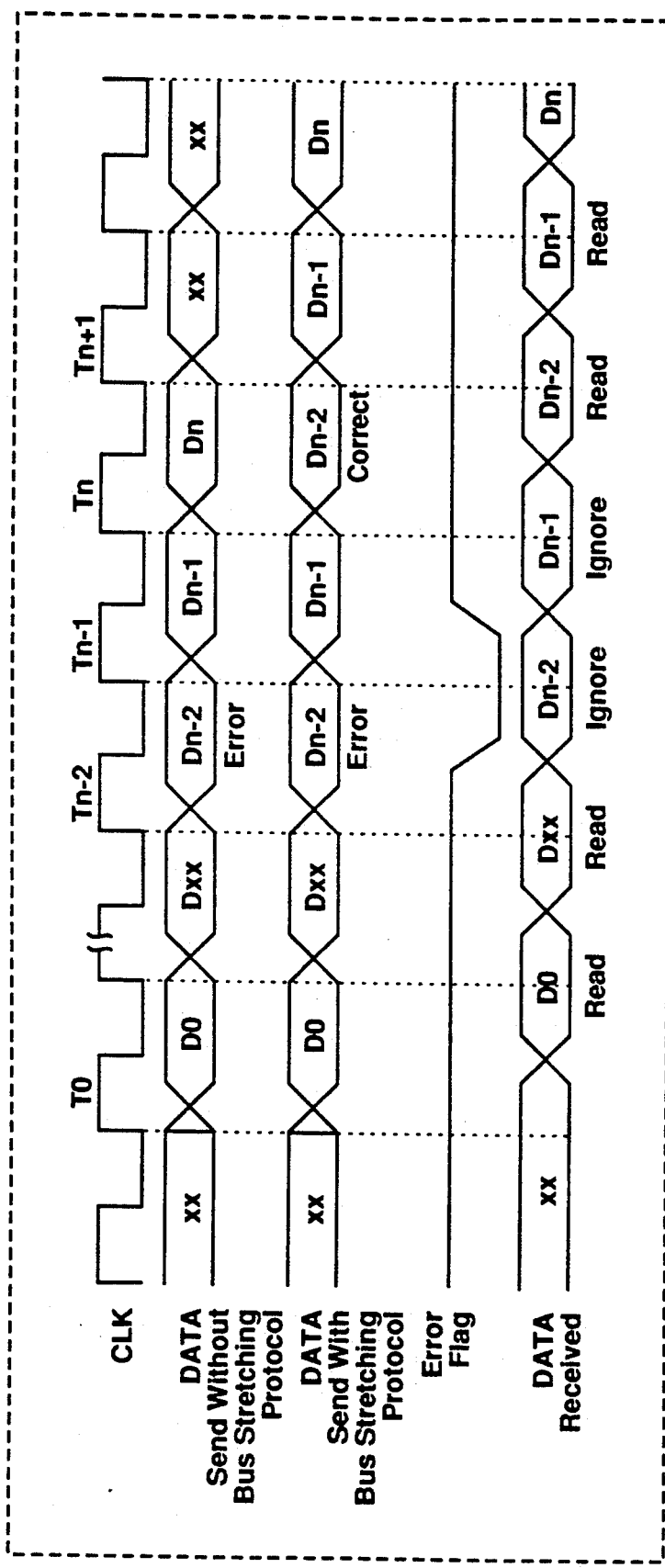
FIG. 21 is a timing chart of the prior art error detection and correction as compared to the bus stretching protocol of the present invention.

Referring now to FIG. 21, a timing chart of the prior art error detection and correction sequence is shown in comparison with the bus stretching protocol of the present invention. The first timing signal represents the clock signal which synchronizes the transmission of data between the sending agent and the receiving agent. The second timing signal represents the prior art error detection and correction sequence by showing data transmissions being sent one portion per clock cycle. The receiving agent in the prior art merely sees what is being transmitted by the sending agent as shown by the second timing signal.

In the prior art, the sending agent is sending a portion of data per clock cycle beginning with data portion D0, then D1, D2, etc., until the portion of data labelled Dn-2 (note that D1, D2, . . . , Dn-3 are represented by Dxx). Then, as can be seen in FIG. 21, the error detection logic detects an error with data portion Dn-2. This error condition is flagged by the sending agent, as is indicated by the fourth signal line labelled error flag. However, in the prior art, the receiving agent's response to the error flag signal is usually to request a retransmission of all portions of the data.

The bus stretching protocol of the present invention handles the error condition differently. When the error detection logic sees bad data the error detection logic transmits the error flag signal to the error correction logic and to the receiving agent. The receiving agent, upon receiving the error flag signal, knows to temporarily suspend reading the data just received (as well as any data following it) from the sending agent for a predetermined period. Stated differently, after receiving the error flag signal the receiving agent knows to not rely on any incoming data from the sending agent during the predetermined period.

Having also received the error flag signal, the error correction logic attempts to correct the detected bad data during the predetermined period. This corrected bad data is then transmitted by the error correction logic to the receiving agent beginning with the next clock cycle after the end of the predetermined period.

The receiving agent, having waited the predetermined period, knows that the error correction logic of the sending agent has attempted to correct the bad data and is now transmitting the corrected data to the receiving agent. Therefore, the receiving agent knows to resume reading the incoming data from the sending agent.

In the preferred embodiment of the present invention, the predetermined period is two clock cycles (an alternative embodiment would use one clock cycle). This is shown in FIG. 21 where the third signal line depicts the data transmission from the sending agent of the present invention. In the third signal line of FIG. 21, data is being transmitted beginning with portion D0, then portions Dxx, then portion Dn-2, etc.

When data portion Dn-2 is analyzed by the error detection logic of the present invention, data portion Dn-2 is found to be bad data. Bad data portion Dn-2 is signalled by the error detection logic on the error flag signal line (signal line 4 of FIG. 21). The error flag signal tells the receiving agent, as shown by the fifth line of FIG. 21, to ignore any incoming data for the predetermined period of two clock cycles. During these two clock cycles the error correction logic of the present invention attempts to correct the bad data in portion Dn-2.

At the end of the predetermined period of two clock cycles, the sending agent begins sending the corrected bad data portion Dn-2 which is followed by any remaining data portions not yet transmitted (in this case, Dn-1 and Dn). Simultaneously (also at the end of the predetermined period of two clock cycles), the receiving agent resumes inputting the data being transmitted by the sending agent on the data bus of signal line 3 in FIG. 21.

By using the bus stretching protocol of the present invention, the receiving agent has thus successfully ignored the bad data portion Dn-2 (and the data portion Dn-1 which followed Dn-2 in the two clock cycle bus stretch). Then, after the two clock cycles, the receiving agent begins reading data again. The receiving agent thus inputs the corrected data portion Dn-2, the resent data portion Dn-1, data portion Dn, etc., until all of the originally requested data is received.

The bus stretching protocol of the present invention has numerous advantages including avoiding having to resend good data which was already transmitted before the bad data was detected. Stated differently, by using the bus stretching protocol of the present invention, all of the processing which the receiving agent did on the valid data before the bad data was detected does not have to be repeated as is the case with a retransmission sequence.

Further, the bus stretching protocol of the present invention is particularly important with block transfers in a burst mode. With block transfers one portion of data is transmitted in each clock cycle. In a burst transfer mode there are multiple portions being transmitted consecutively, one right after the other. Thus, with block transfers in a burst mode, continuity is critical to maintaining the performance and synchronization of the transfer process. Therefore, the bus stretching protocol of the present invention is particularly useful in a block transfer burst mode because it maintains the continuity of the process.

Additionally, by avoiding retransmission of the good data sent before the bad data was detected, the bus stretching protocol of the present invention cuts down on contention for (increase availability of) the sending agent. This is because the sending agent will complete the entire transaction sooner than if it had to retransmit all of the originally requested data.

The bus stretching protocol of the present invention also cuts down on bus traffic taken up by retransmission requests which usually occur after an error is detected. Retransmission requests are avoided in the present invention because the sending agent has the intelligence, when bad data is detected, to correct and resend the bad data and any that would have followed it. Retransmission requests are also avoided because the receiving agent has the intelligence, when bad data is detected, to not send a retransmission request and, instead, to wait out two clock cycles until the corrected data and any that would have followed it are transmitted by the sending agent.

The bus stretching protocol of the present invention also avoids the latency caused by a correct only mode of ECC checking where each portion of data is checked before it is transmitted to the receiving agent.

The bus stretching protocol of the present invention is particularly valuable with a split transaction scheme. This is because with a split transaction scheme there is always the possibility that multiple agents are waiting for a response to an outstanding request to a particular sending agent. In that case, if the particular sending agent had to go through an entire retransmission of all portions of data instead of just the corrected bad data (and any which would have followed it), then not only is the receiving agent having to wait longer to get the originally requested data, but all other requesting agents (those with outstanding requests) would also have to wait longer to receive a response from the particular sending agent.

In the foregoing specification, the invention has been described with reference to a specific exemplary embodiment and alternative embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

What is claimed is:

1. A method for handling invalid data being transmitted from a first agent to a second agent in a computer system, said invalid data handling method comprising the steps of:
   a) if the first agent determines that data to be transmitted by the first agent is invalid data, then the first agent transmits an error signal to the second agent indicating the invalid data, the first agent attempts to correct the invalid data, the first agent transmits the attempted corrected invalid data to the second agent after a predetermined period, and the first agent transmits any remaining data not yet transmitted;
   b) if the second agent receives said error signal, then the second agent suspends reading data for a predetermined period, and the second agent resumes reading data.

2. The invalid data handling method of claim 1, wherein the predetermined period is two clock cycles.

3. The invalid data handling method of claim 2, wherein the data is being transmitted in block transfer burst mode.

4. The invalid data handling method of claim 3, wherein the second agent's suspension and resumption of data reading for two clock cycles in response to the invalid data signal, and the first agent's transmission of the attempted corrected invalid data after two clock cycles and transmission of any remaining data not yet transmitted, maintains the sequential consistency of the data being transmitted from the first agent to the second agent.

5. The invalid data handling method of claim 1, wherein the data is being transmitted from the first agent to the second agent across a computer bus.

6. A method for handling invalid data being transmitted from a first agent to a second agent in a computer system which avoids unnecessary delay to a third agent waiting for data to be transmitted from the first agent, said invalid data handling methods comprising the steps of:
   a) if the first agent determines that data to be transmitted by the first agent is invalid data, then the first agent transmits an error signal to the second agent indicating the invalid data, the first agent attempts to correct the invalid data, the first agent transmits the attempted corrected invalid data to the second agent after a predetermined period, and the first agent transmits any remaining data not yet transmitted;
   b) if the second agent receives said error signal, then the second agent suspends reading data for a predetermined period, and the second agent resumes reading data;
   c) if the first agent has transmitted all of the attempted corrected invalid data and the remaining data to the second agent, then the first agent transmits data to the third agent.

7. The invalid data handling method of claim 6, wherein the predetermined period is two clock cycles.

8. The invalid data handling method of claim 7, wherein the data is being transmitted in block transfer burst mode.

9. The invalid data handling method of claim 8, wherein the second agent's suspension and resumption of data reading for two clock cycles in response to the invalid data signal, and the first agent's transmission of the attempted corrected invalid data after two clock cycles and transmission of any remaining data not yet transmitted, maintains the sequential consistency of the data being transmitted from the first agent to the second agent which allows the first agent to begin transmitting data to the third agent sooner than if the first agent had to resend all of the data which the second originally requested when the first agent detected invalid data.

10. The invalid data handling method of claim 6, wherein the data is being transmitted from the first agent to the second agent across a computer bus and wherein the data is being transmitted from the first agent to the third agent across a computer bus.

* * * * *

UNITED STATES PATENT AND TRADEMARK OFFICE
CERTIFICATE OF CORRECTION

PATENT NO. : 5,271,020
DATED : 12/14/93
INVENTOR(S) : Suresh K. Marisetty

It is certified that error appears in the above-indentified patent and that said Letters Patent is hereby corrected as shown below:

Column 15, line 59, Delete " Immediarely"    Insert in place thereof
--immediately--

Signed and Sealed this

Tenth Day of October, 1995

*Attest:*

BRUCE LEHMAN

*Attesting Officer*    Commissioner of Patents and Trademarks